United States Patent [19]

Long, Jr.

[11] Patent Number: 4,582,612

[45] Date of Patent: Apr. 15, 1986

[54] SEWAGE SLUDGE TREATMENT APPARATUS

[75] Inventor: Charles A. Long, Jr., Birmingham, Ala.

[73] Assignee: Long Enterprises, Inc., Birmingham, Ala.

[21] Appl. No.: 650,960

[22] Filed: Sep. 14, 1984

Related U.S. Application Data

[63] Continuation-in-part of Ser. No. 560,058, Dec. 9, 1983, Pat. No. 4,487,699.

[51] Int. Cl.[4] .............................................. C02F 1/78
[52] U.S. Cl. .................... 210/760; 210/764; 210/765; 210/85; 210/86; 210/90; 210/104; 210/134; 210/137; 210/138; 210/143; 210/173
[58] Field of Search ............... 210/86, 90, 88, 89, 210/961, 743, 760, 764, 765, 104, 134, 137, 138, 143, 220, 232, 604, 627–629, 174, 194, 197, 620, 621, 173

[56] References Cited

U.S. PATENT DOCUMENTS

| 888,090 | 5/1908 | Kestner . | |
|---|---|---|---|
| 1,790,975 | 2/1931 | Dallas et al. . | |
| 2,054,395 | 9/1936 | Streander . | |
| 2,077,907 | 4/1937 | Streander . | |
| 2,090,384 | 8/1937 | Durdin, III . | |
| 2,165,889 | 7/1939 | Fischer et al. . | |
| 2,337,507 | 12/1943 | Thayer . | |
| 2,468,865 | 5/1949 | Campobasso et al. . | |
| 2,591,134 | 4/1952 | Canariis . | |
| 2,597,802 | 5/1952 | Kappe . | |
| 3,054,602 | 9/1962 | Proudman . | |
| 3,133,017 | 5/1964 | Lambeth . | |
| 3,143,498 | 8/1964 | Fordyce et al. . | |
| 3,271,304 | 9/1966 | Valdespino et al. . | |
| 3,323,782 | 6/1967 | Clough . | |
| 3,335,082 | 8/1967 | Ullrich . | |
| 3,341,450 | 9/1967 | Ciabattari et al. . | |
| 3,423,309 | 1/1969 | Albertson . | |
| 3,459,303 | 8/1969 | Bradley . | |
| 3,476,250 | 11/1969 | Fifer . | |
| 3,497,185 | 2/1970 | Dively . | |
| 3,515,377 | 6/1970 | Ray . | |
| 3,525,685 | 8/1970 | Edwards . | |
| 3,547,813 | 12/1970 | Robinson et al. . | |
| 3,572,658 | 3/1971 | Ravitts . | |
| 3,573,203 | 3/1971 | Kaelin ............................. | 210/629 |
| 3,650,950 | 3/1972 | White . | |
| 3,660,277 | 5/1972 | McWhirter et al. . | |
| 3,677,409 | 7/1972 | Ferm et al. . | |
| 3,724,667 | 4/1973 | McKinney . | |
| 3,725,258 | 4/1973 | Spector et al. . | |
| 3,772,188 | 11/1973 | Edwards ........................... | 210/197 |
| 4,487,699 | 11/1984 | Long ................................. | 210/232 |

FOREIGN PATENT DOCUMENTS 470873 8/1937 United Kingdom ................ 210/629

Primary Examiner—Frank Sever
Attorney, Agent, or Firm—Panitch Schwarze Jacobs & Nadel

[57] ABSTRACT

The present invention relates to an apparatus for treating sewage sludge in which the sludge is conveyed to a vessel having an oxygen-rich atmosphere. The sludge is channelled through a first dispersing means to a plurality of second dispersing means by which it is dispersed throughout the oxygen-rich atmosphere where it is completely oxygenated. Preferably, the first dispersing means comprises separable components which define the channelling means. Preferably, the second dispersing means are aligned with the channelling means and either arranged around the inner periphery of the vessel, or attached to the first dispersing means.

19 Claims, 19 Drawing Figures

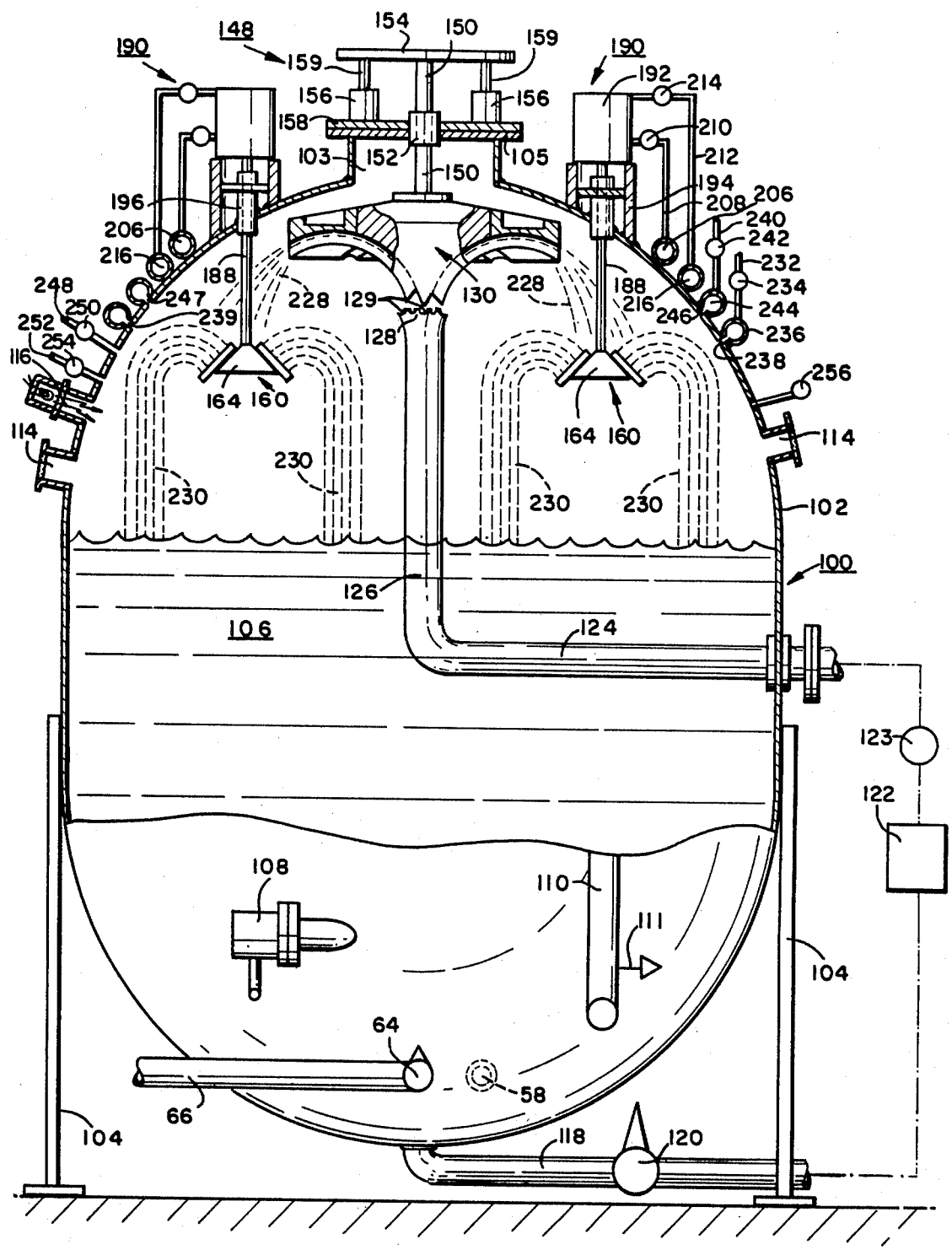

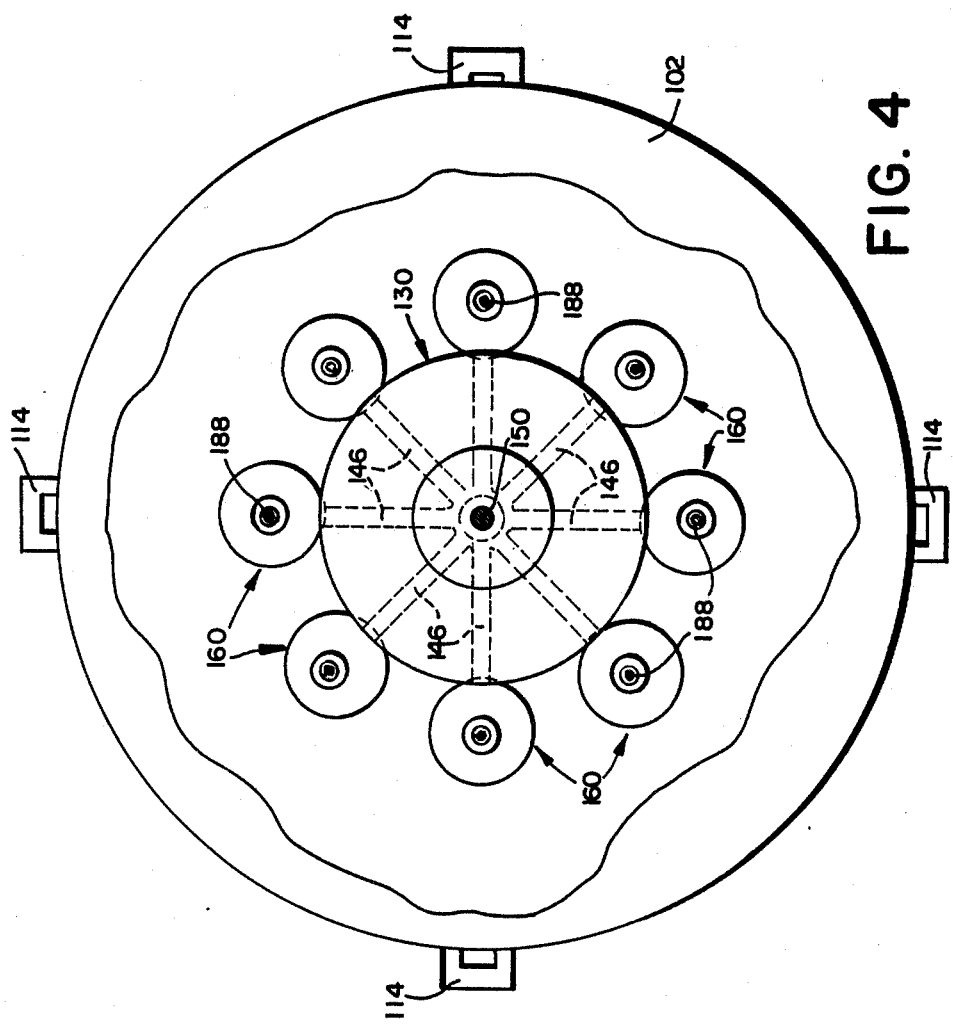

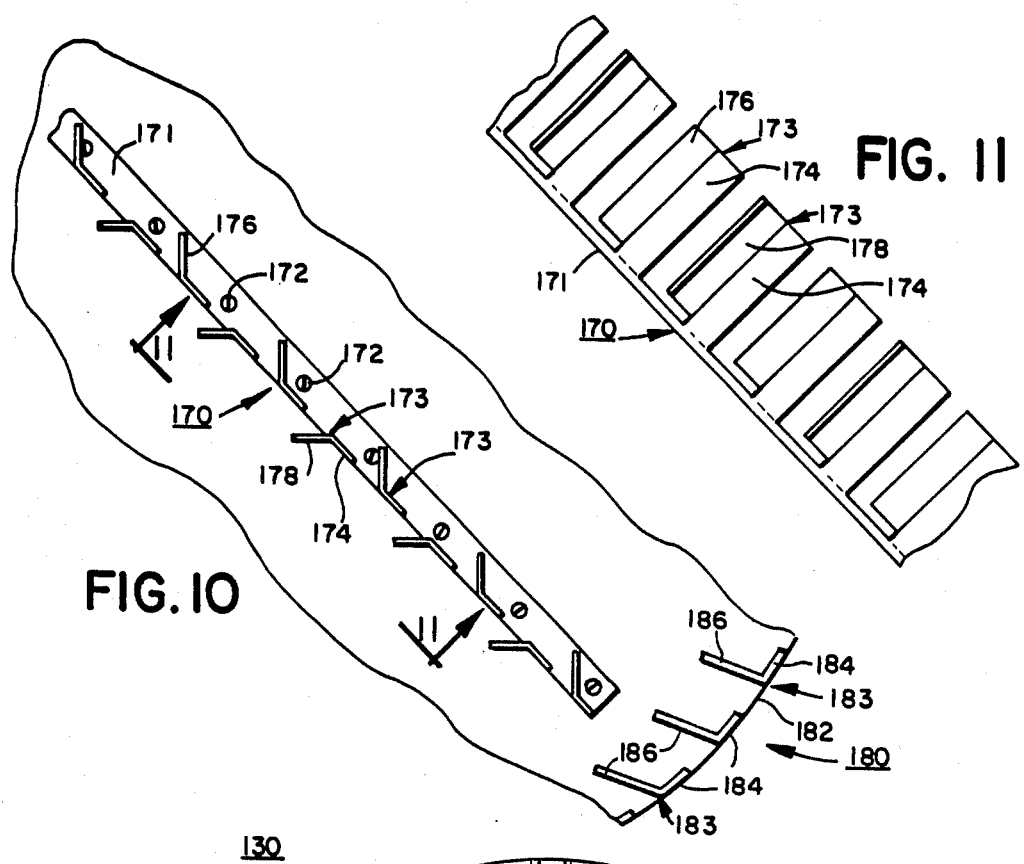
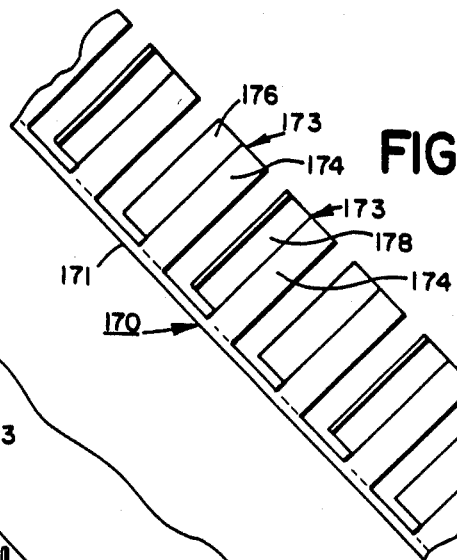
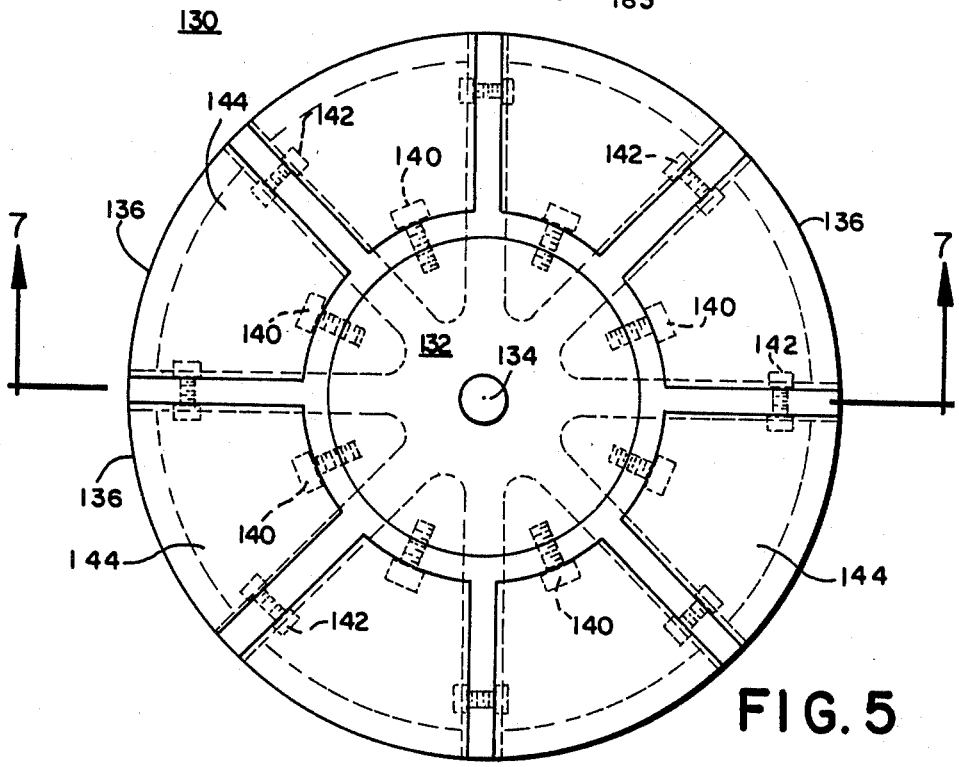

SEWAGE SLUDGE TREATMENT APPARATUS

CROSS-REFERENCE TO RELATED APPLICATION

This application is a continuation-in-part of copending U.S. patent application Ser. No. 560,058, filed Dec. 9, 1983, entitled Sewage Sludge Treatment Apparatus and Process, now U.S. Pat. No. 4,487,699.

BACKGROUND OF THE INVENTION

This invention relates to an improvement to the novel apparatus for treating sewage and, in particular, sewage sludge, set forth in the above-identified copending application.

Traditionally, sewage and specifically sewage sludge has been difficult to treat because it is, almost by definition, extremely variable in composition. In addition to human liquid and solid organic waste, the sludge to be treated in accordance with the present invention may include industrial and commercial sludge which is susceptible to aerobic treatment. In general, the present invention provides a means and process for highly efficient interaction of sludge particles with oxygen, in the form of $O_2$ gas and/or $O_3$ gas.

The present invention preferably employs the use of hyperbaric vessels containing pressurized oxygen and the sludge, and provides means for increasing the surface area of sludge to be treated and the interaction time in which sludge is oxygenated compared to prior art apparatus and processes.

A further feature of the present invention resides in the substantially infinite adjustability of the various components of the apparatus and process so that they can be finely tuned at any time and adjusted automatically, semi-automatically and/or manually to treat different types, compositions and thicknesses of various sludges without requiring the use of alternate equipment.

The present invention is an important advancement in the treatment of sewage sludge, generally consisting of four basic steps. Preferably, the first step is to adjust the pH of the sludge to an appropriate acidic level, so that it is more susceptible to aerobic treatment. Second, the sludge is dispersed in an oxygen-rich and, preferably, a pressurized atmosphere. Third, the oxygen reacts directly or indirectly with contaminants in the sludge to convert them into stable materials. Fourth, bacteria contained in the sludge are rendered harmless so that the treated sludge may be disposed of in landfill or other areas without significant adverse environmental consequences.

The present invention is intended primarily for treatment of activated sludge, namely, waste from domestic, commercial and industrial sources which create a biologically degradable material. A batch of the pH adjusted waste to be treated is divided into small droplets and the droplets are dispersed within a pressure vessel where they are oxygenated by being exposed to oxygen ($O_2$) and ozone ($O_3$) for a substantial period of time. The Biological Oxygen Demand (BOD) and the Chemical Oxygen Demand (COD) of the waste are substantially saturated and satisfied. The addition of ozone produces an almost complete destruction and elimination of coliform, fecal coliform, salmonella and other harmful bacteria from the batch of sludge being treated. Although the coliform and fecal coliform bacteria are not in themselves particularly harmful, when they are present, it is recognized that other harmful bacteria are present. Thus, when the coliform and fecal coliform bacteria are destroyed, it is an indication that the other harmful bacteria, which are more difficult to detect, are also destroyed.

Further background concerning the treatment of activated sludge is set forth, for example, in U.S. Pat. No. 3,724,667, issued Apr. 3, 1973 to McKinney. The present invention is an improvement over the McKinney activated sludge treatment apparatus and process. The heart of McKinney's system is the spraying of sludge into a pressurized atmosphere rich in oxygen. As explained in the patent, McKinney's system is based upon the belief that the combination of an oxygen-rich gas and the increased pressure increases the efficiency of the oxygen transfer to the droplets of sludge within the enclosed treatment vessel.

Another prior art technique for treating sewage in a pressurized oxygen-rich atmosphere is set forth in U.S. Pat. No. 3,772,188, issued Nov. 13, 1973 to Edwards. In the Edwards system, sewage is transported into a vessel and impacted against a rotating comminutor which breaks the sewage into small particles for interaction with the pressurized oxygen atmosphere.

Another pertinent prior art patent is U.S. Pat. No. 1,790,975, issued Feb. 3, 1931 to Dallas, et al. This patent treats sewage by causing it to be aerated after it has been distributed through distributor heads to the atmosphere above the level of the sewage. After it is sufficiently aerated, it is discharged. Two different embodiments of distributor heads are illustrated and described in this patent.

By the present invention, small sludge particles are created efficiently and means are provided for greatly enhancing the surface area of the sludge to be treated and the time of interaction of finely divided sludge particles with oxygen-rich atmosphere, preferably in a pressurized environment. The present invention is believed to be extremely well suited to large scale treatment systems and very large interaction vessels. By means of the substantially infinite adjustability of its various components, the present invention is also very effective in treating sludge which can and does vary in composition almost continuously.

SUMMARY OF THE INVENTION

The present invention includes an apparatus for use in a sewage sludge treatment system comprising a vessel including sludge inlet means for conveying sludge to the vessel to be accumulated in a lower portion of the vessel, a sludge delivery means having a discharge end for delivering the sludge from the lower portion to an upper portion of the vessel, oxygen inlet means for delivering oxygen to the upper portion of the vessel, sludge outlet means for removing sludge from the lower portion of the vessel, and gas outlet means for removing gas from the upper portion of the vessel, first sludge dispersing means and a plurality of second sludge dispersing means located within the upper portion of the vessel, the first sludge dispersing means being generally axially aligned with and attached to the discharge end of the sludge delivery means, the first sludge dispersing means including a plurality of channelling means for channelling the sludge from the sludge delivery means through outlets in the first sludge dispersing means toward the second sludge dispersing means, each of the second sludge dispersing means being generally aligned with a channelling means of the first sludge dispersing means so that a major portion of the sludge being channelled from the first sludge dispersing means impacts against the second sludge dispersing means for dividing the sludge into fine particles and dispersing the sludge particles within the upper portion of the vessel to become oxygenated as they interact with oxygen in the upper portion of the vessel, the oxygenated particles falling to and being collected in the lower portion of the vessel.

In one embodiment, each of the second sludge dispersing means of the present invention comprises a body having a sludge impact surface with a concave face converging centrally to form a generally conical tip extending from the face, the second dispersing means being adjustably secured to the inner wall of the vessel around the inner periphery thereof.

In another embodiment, each of the second sludge dispersing means is attached to the first dispersing means and comprises a body having an impact surface for directing a portion of the sludge exiting the channelling means generally upwardly and outwardly toward the walls of the vessel.

In order to control all of the components of the apparatus and process, it is preferred to use individual control means for each vessel and the respective means associated therewith. Individual data processors may also be used to create a history and data base from which treatment of various sludges in the future may be determined. Likewise, an overall control means and data processing station preferably are used to coordinate the operation of multiple treatment units within a combined treatment system.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a vertical cross-sectional view, partly in side elevation, of one embodiment of a reactor assembly and related components in accordance with the invention.

FIG. 4 is a plan view, partly broken away to show the internal components of the reactor assembly illustrated in FIG. 3.

FIG. 5 is a plan view of a preferred embodiment of a distributor head for use in the invention.

FIG. 10 is a plan view of a portion of the comminuting and distributing vanes contained on the rotary assembly illustrated in FIGS. 8 and 9.

FIG. 11 is a side elevational view of the comminuting and distributing vanes taken along lines 11—11 of FIG. 10.

DESCRIPTION OF THE PREFERRED EMBODIMENTS

Figure 1:
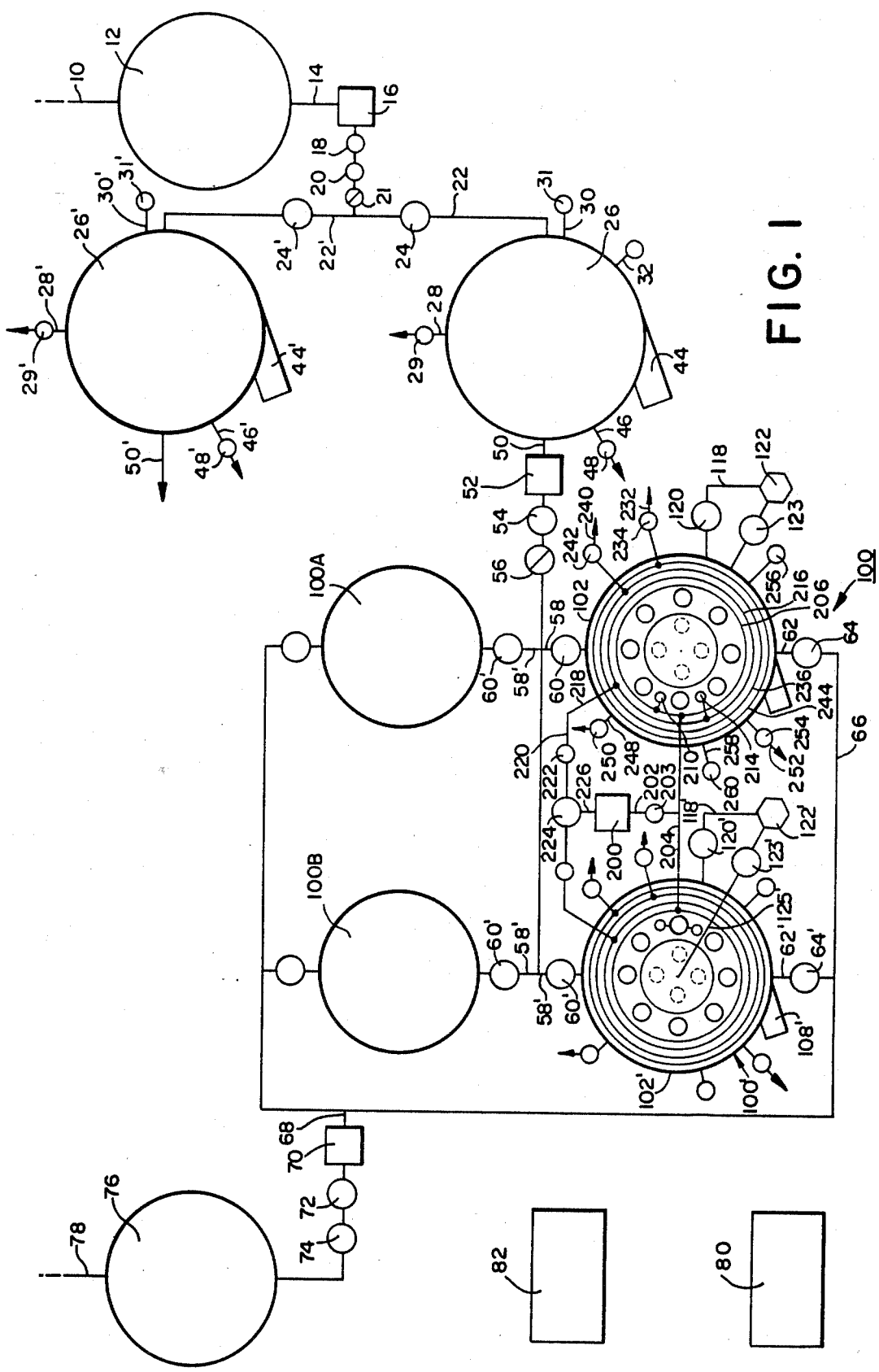
FIG. 1 is a plan view of a schematic representation of the invention associated with other components of a sewage and sludge treatment system.
Figure 2:
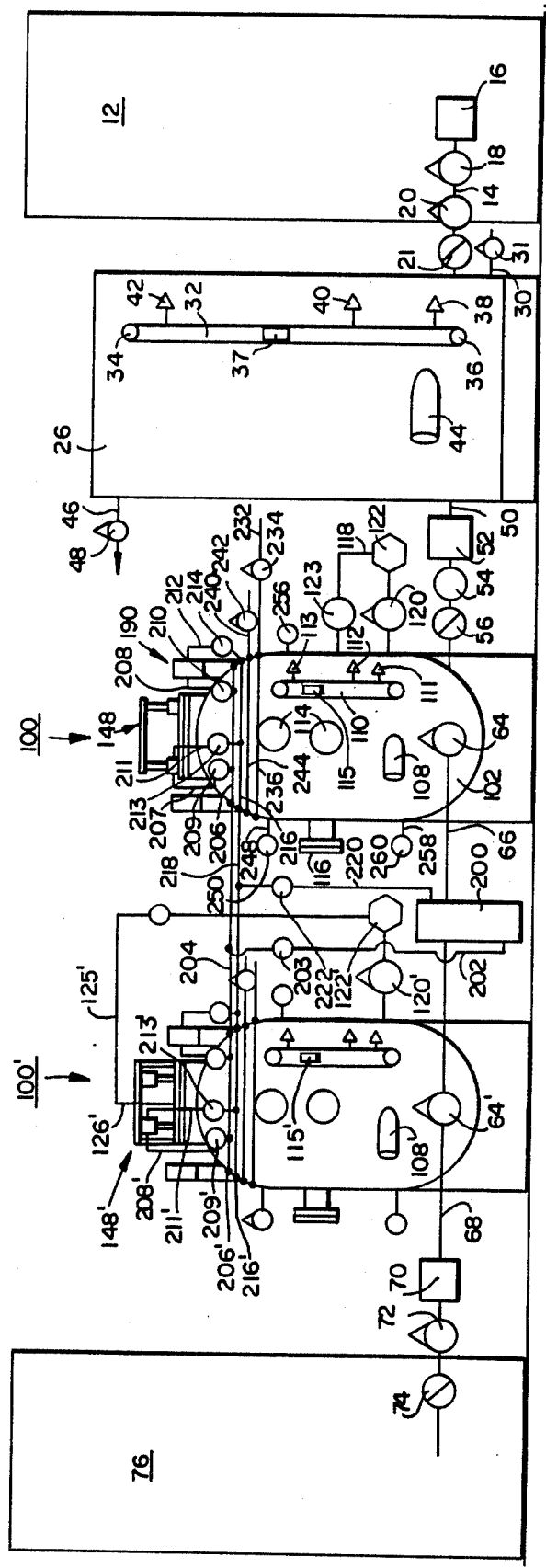
FIG. 2 is a side elevational view of a schematic representation of the invention and associated components illustrated in FIG. 1.
Figure 6:
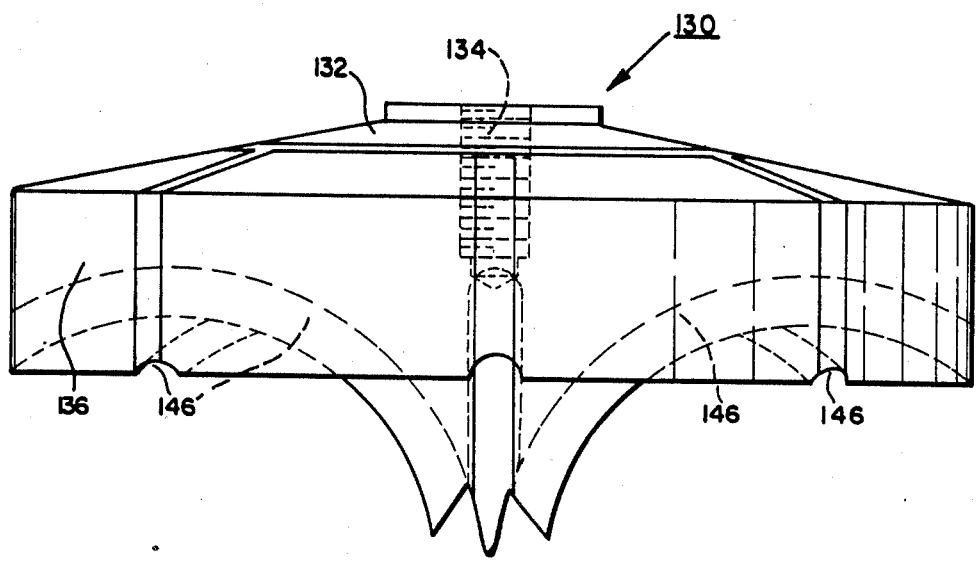
FIG. 6 is a side elevational view of the distributor head illustrated in FIG. 5.
Figure 7:
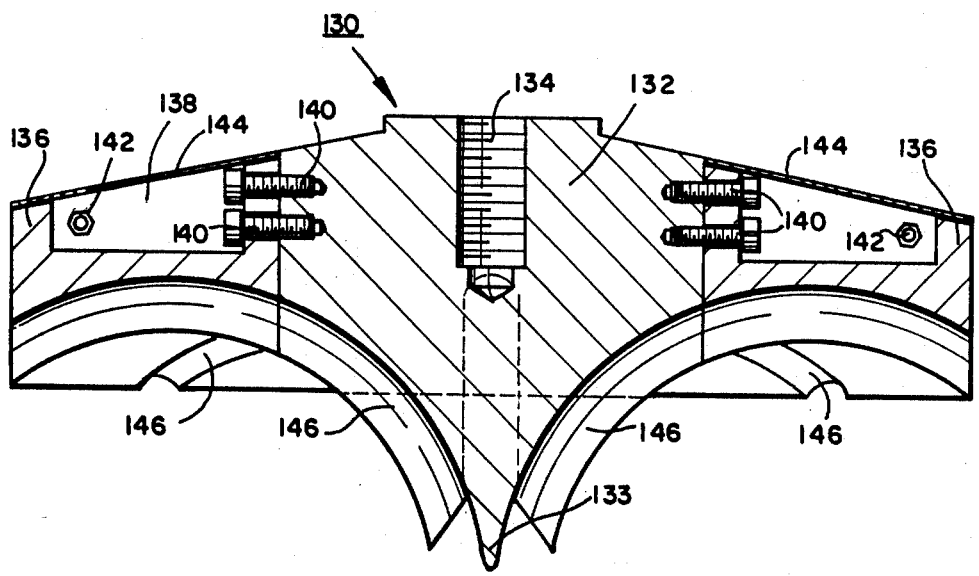
FIG. 7 is a vertical cross-sectional view of the distributor head taken along lines 7—7 of FIG. 5.

Referring to the drawings in detail, wherein like numerals indicate like elements, there is shown in FIGS. 1 and 2 one arrangement of apparatus according to the present invention to be used in a large scale sewage treatment system. The present invention is intended for use in treating activated sludge which is generally too thick to be treated efficiently on a large scale basis by presently existing commercial equipment known to the inventor. The present invention can be incorporated with presently existing wastewater treatment plants. Most existing wastewater treatment plants are capable of producing sludge with a solids content of about 1½% to 4% by weight. The present invention has been designed to treat sludge having a solids content of greater than 4% to about 6% by weight, more preferably from about 5% to about 6%. The process and apparatus is believed to be most cost effective with sludge having a solids content of about 5½% to 6% by weight.

The present invention is being described with respect to certain components of conventional treatment systems to indicate how the present invention can be integrated in an overall sewage treatment system. The conventional components will be described in sufficient detail only to make it clear how the present invention can be coordinated with them.

With reference to FIGS. 1 and 2, sludge which has been ground up or comminuted into fine particles by a sludge grinder, not shown, is delivered through sludge inlet conduit 10 from typical sludge thickeners of a conventional wastewater treatment plant. The sludge is delivered through conduit 10 into a sludge holding tank 12. From there, the sludge is subjected to a pH adjustment operation believed to be a novel aspect of the present invention. The sludge is pumped by sludge pump 16 through sludge outlet conduit 14, manual sludge valve 18, remote controlled sludge valve 20 and sludge check valve 21. There, the sludge is split into two portions. One portion travels through conduit 22 and remote controlled pH adjust inlet valve 24 into a pH adjustment tank 26.

The other portion of the sewage enters conduit 22' and flows through remote controlled pH adjust inlet valve 24' to another pH adjustment tank 26'.

An acid, such as sulfuric acid, is obtained from storage tanks, not illustrated, and pumped into the pH adjustment tanks through acid inlet conduits 28 and 28' and remote controlled acid inlet valves 29 and 29'. The acid is mixed with the sludge until a pH level of from about 3 to about 4.5 is reached. It is believed that the optimum value of pH adjustment for most sludge to be treated in accordance with the process is from 3 to 3.5, although the optimum pH for a particular sludge composition may vary, based upon experience. The pH of the sludge is monitored through sampling outlet conduits 30 and 30' and sampling valves 31 and 31' associated with each pH adjustment tank 26 and 26', respectively.

The level of sludge and acid within each pH adjustment tank 26 and 26' is monitored by means of pH adjust sight tube assembly 32 (described with respect to tank 26, only), best illustrated in FIG. 2. Sight tube 32 may be at least partially made of glass or other transparent material. It includes sight tube valve 34 and sight tube valve 36 at its upper and lower ends, respectively. The float assembly 37 is disposed within sight tube 32. The float is responsive to the level of sludge contained within the tank and activates empty level switch 38, half full level switch 40 and full level switch 42, depending upon the level of contents in the tank. Empty level switch 38 represents an empty or low level condition. Half full level switch 40 represents a half full condition. Full level switch 42 represents a full tank condition.

The float and switches are part of a control and data-processing system capable of automating the operation of the treatment system. The interrelation of the components, including the various remote controlled valves which are part of the automated system, will be described in general terms hereinafter.

To assure a uniform mixture of acid and sludge, each tank is mixed by means of pH adjust mixer assemblies 44 and 44'. Preferably, the mixer assemblies include a hydraulically driven motor to which a propeller or other mixing means is attached and located within pH adjustment tank 26. The details of the mixer assemblies, including the hydraulic drive means, are not illustrated since they are conventional.

To aid in the flow of sludge into and out of pH adjustment tanks 26 and 26', air is allowed to travel through air conduits 46 and 46' and through remote controlled air valves 48 and 48'.

After the pH of the sludge is adjusted to an appropriate level, it is pumped through reactor inlet conduits 50 and 50' by reactor inlet pump 52 toward the reactor assemblies 100, 100', 100A and 100B of the present invention. As best illustrated in FIG. 1, the sludge from one pH adjustment tank 26 is directed toward a number of reactor assemblies in accordance with the present invention. Four reactor assemblies are illustrated as receiving sludge from pH adjustment tank 26 in FIG. 1, but any other number of reactor assemblies, such as reactor assembly 100, 100', 300 or 500 could be supplied from a single pH adjustment tank, depending upon the size of the pH adjustment tanks and treatment vessels of the reactor assemblies, the capacity of the pumps, conduits, valves, etc. Also as illustrated best in FIG. 1, reactor inlet conduit 50' ends in an arrow. This designates that pH adjustment tank 26' could feed a like or different number of reactor assemblies in the same general arrangement as reactor assemblies 100, 100', 100A and 100B, or any greater or lesser number. The additional reactor assemblies are not illustrated for the sake of ease of understanding the drawings.

Reactor inlet pump 52 is preferably driven by a hydraulic motor like all other pumps preferably used in the present invention (except for the main hydraulic circulation pump 200, which is preferably driven by an electric motor) because of the ability of hydraulic motors to be adjusted precisely. Pump 52 pumps sludge from pH adjustment tank 26 through reactor inlet conduit 50, remote controlled reactor inlet master valve 54, reactor inlet check valve 56, through reactor inlet conduits 58 and 58', remote controlled reactor inlet valves 60 and 60' and into reactor assemblies 100, 100', 100A and 100B. Again, depending upon the capacity of the pH adjustment tank, the pump, conduits, valves and other components of the inlet means, any one or any number of reactor assemblies can receive sludge in series, in parallel or simultaneously, depending also upon the desired control of the waste treatment system.

The reactor assemblies and associated components, generally designated as reactor assemblies 100, 100', 100A, 100B, 300 and 500, will be discussed in greater detail hereinafter. However, at this time, it will be assumed that the sludge has been treated in the reactor assemblies according to the present invention, and the treated activated sludge is ready to be conveyed for further treatment by the outlet means associated with each reactor assembly. To make the explanation easier to understand, reference will be made only to reactor assemblies 100 and 100', it being understood that substantially similar arrangements could be associated with reactor assemblies 100A, 100B, 300, 500, and any other reactor assemblies forming a part of the system.

After the sewage has been treated in reactor assemblies 100 and 100', it passes through reactor outlet conduits 62 and 62' and through remote controlled reactor outlet valves 64 and 64' into a reactor outlet conduit 66. From conduit 66, the treated sludge passes into a reactor outlet common conduit 68 where it is pumped by a pump 70, preferably driven by a hydraulic motor, through remote controlled valve 72 and check valve 74 into a flotation unit or other holding tank or processing unit 76. Conduit 78 is an outlet from unit 76, through which the treated sludge travels for further processing or discharge. Details of the system for further treating the activated sludge need not be described in detail here, since it does not form a specific part of the present invention.

Also as illustrated in FIG. 1, numeral 80 designates a local control station, including control and data processing means which provide automatic, semi-automatic or manual control for a single reactor assembly, or as set forth hereinafter, for one pair of reactor assemblies, such as reactor assemblies 100 and 100'.

Numeral 82 in FIG. 1 designates a master control station including control means and data processing means for controlling and recording data relating to the overall operation of the system, including the control of the local control stations and groups of reactor assemblies. The general purpose and function of the local and master control stations will be set forth hereinafter.

Figure 12:
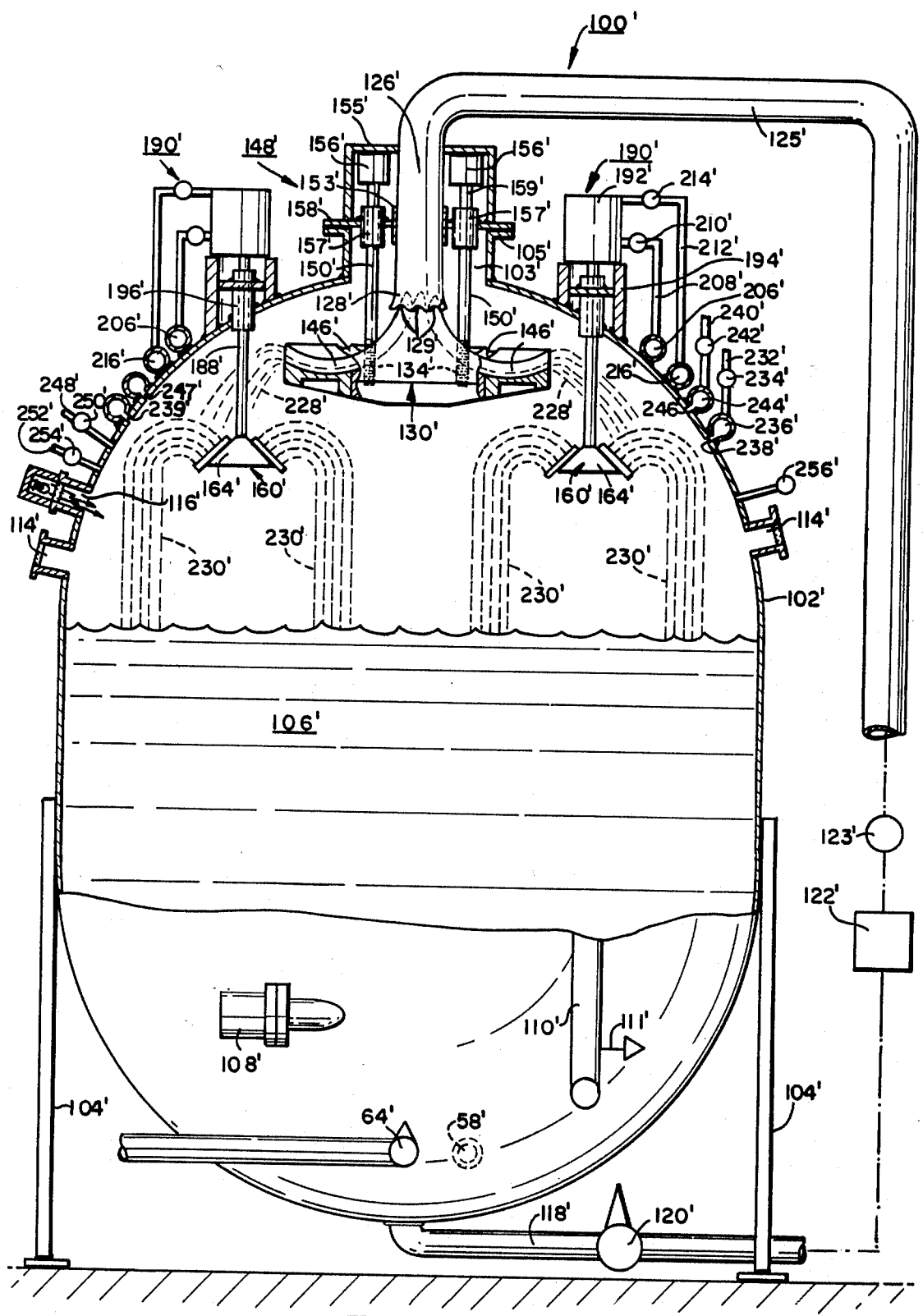
FIG. 12 is a vertical cross-sectional view partly in side elevation of an alternate embodiment of a reactor assembly and related components in accordance with the invention.
Figure 13:
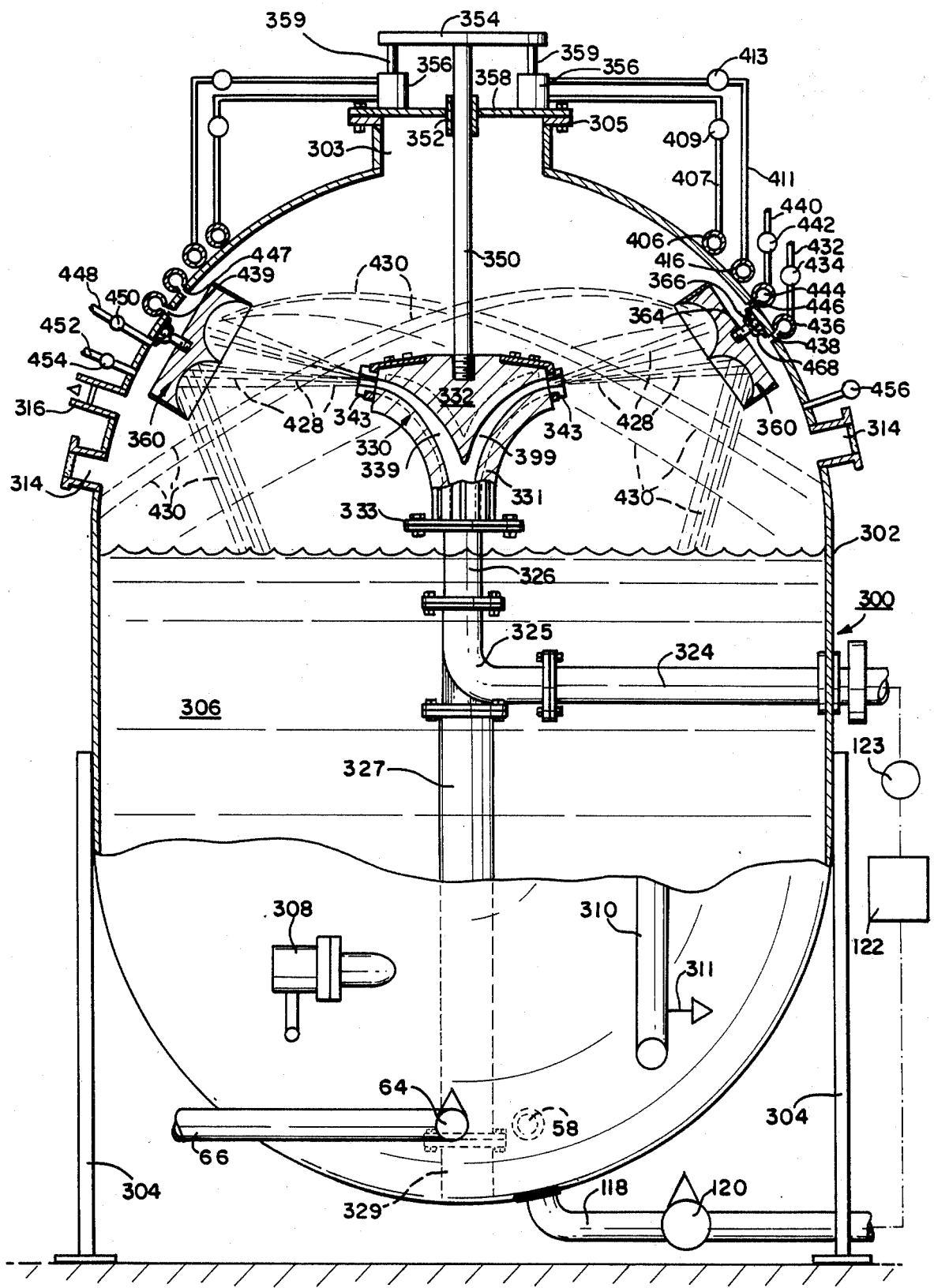
FIG. 13 is a vertical cross-sectional view partly in side elevation of another embodiment of a reactor assembly and related components in accordance with the present invention.
Figure 17:
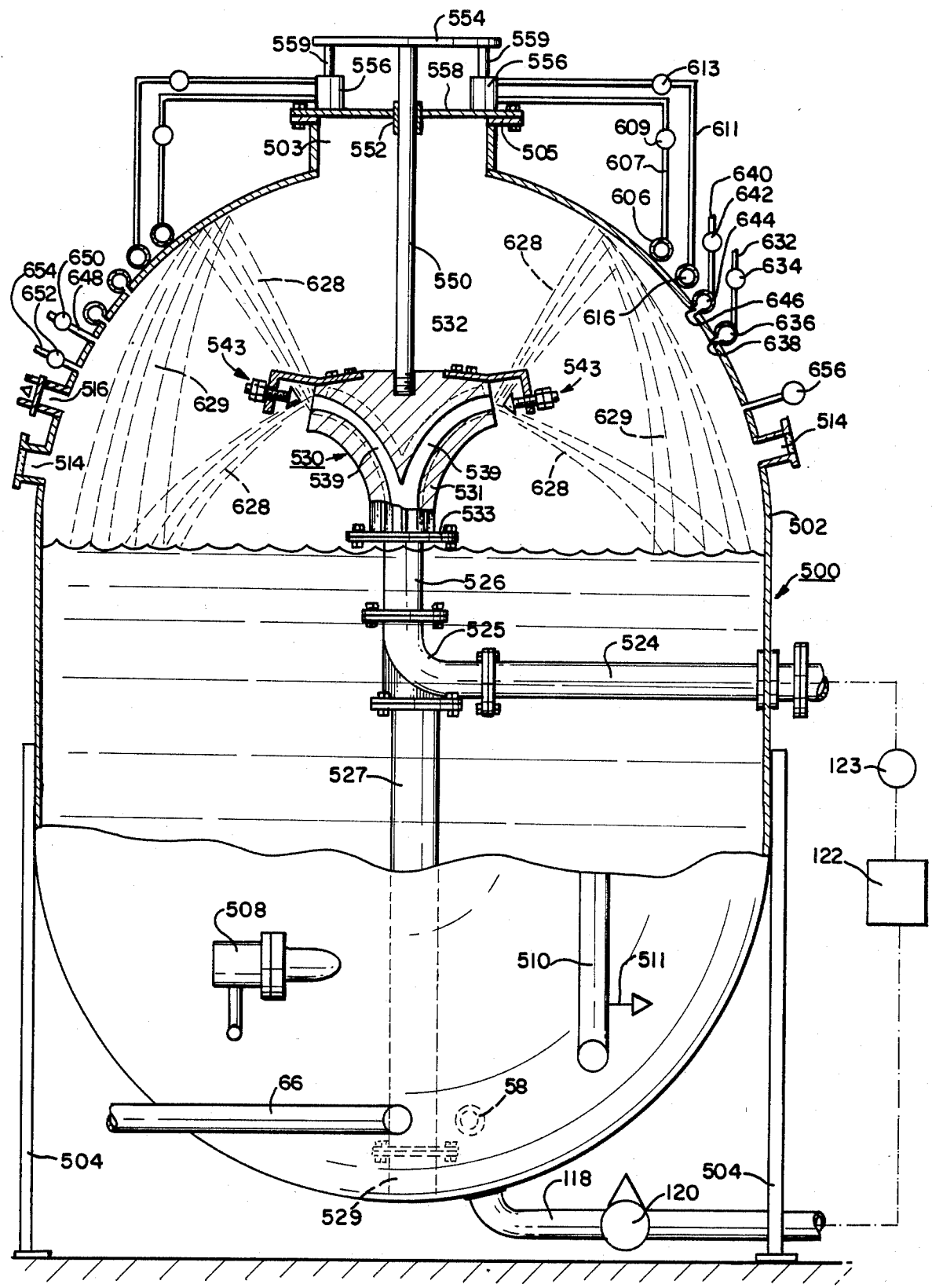
FIG. 17 is a vertical cross-sectional view partly in side elevation of still another embodiment of a reactor assembly and related components in accordance with the present invention.

FIG. 3 illustrates the components of one embodiment of a reactor assembly according to the present invention. FIGS. 12, 13 and 17 illustrate alternate embodiments of other reactor assemblies 100', 300 and 500, respectively, which could be substituted for any or all of reactor assemblies 100, 100A and/or 100B. To more clearly describe the reactor assemblies made in accordance with each of the embodiments, reference should be made first to FIG. 3 which illustrates the components of reactor assembly 100, for example. Next, reference should be made to FIGS. 12, 13 and 17 which illustrate the components of reactor assemblies 100', 300 and 500. To make the explanation easier to understand, several of the components shown in FIGS. 3, 12, 13 and 17 are illustrated in a schematic form, rather than by reference to specific structure. It will be apparent by reviewing FIGS. 3, 12, 13 and 17 that reactor assemblies 100', 300 and 500, respectively, illustrated in FIGS. 12, 13 and 17 have a great many of the same components as reactor assembly 100 illustrated in FIG. 3. Accordingly, components of reactor assembly 100' which are equivalent to components of reactor assembly 100 will be identified by primed numerals, and will not be described with respect to reactor assembly 100', except where it is necessary to understand the construction and operation of reactor assembly 100'. Likewise, the last two digits of the identifying numerals of reactor assemblies 300 and 500 correspond with the last two digits of identifying numerals of reactor assembly 100 or 100' and will not be described in detail, except where differences exist.

As illustrated in FIG. 3, a major component of reactor assembly 100 is a treatment vessel 102 supported above a foundation of any suitable type and strength by support members 104. Although treatment vessel 102 can be of any desired size, it is preferred that it be capable of handling a large volume of sludge. Typical dimensions of the vessel having a shape illustrated in FIG. 3 (and FIG. 12) would be about 12 feet in diameter and about 16 feet in height. Treatment vessel 102 may be made in other shapes besides that illustrated. The vessel should be able to withstand pressures of at least about six atmospheres, since it is preferred that the sludge be subjected to a hyperbaric, that is, pressurized, treatment. Accordingly, the material used to make the vessel should be durable, as well as easy to maintain and non-reactive with the acidified sludge environment. A suitable material would be stainless steel, for example.

A manhole opening 103 is located in a portion of treatment vessel 102, preferably at the top. A flange 105 is formed around the upper rim of the manhole opening. As illustrated in FIG. 3, sludge 106 is contained in a lower portion of the vessel after entering the vessel through reactor inlet conduit 58. The "lower portion" of the vessel includes any portion of the vessel containing liquid, and need not be limited to any particular volume of sludge within the vessel. However, it is important that there be an upper portion of the vessel not containing sludge located above the level of sludge 106 and above a discharge end 128 of an internal reactor circulation conduit 124. The upper portion of the vessel likewise is not defined by any specific volume, but should be sufficient to contain first and second dispersing means illustrated in the form of distributor head 130 and rotor assemblies 160, respectively, and should have sufficient volume so that the dispersed sludge can interact completely with the oxygen in the upper portion.

A reactor mixer is schematically illustrated by numeral 108. The mixer preferably is hydraulically driven as set forth in the description of pH adjust mixer 44 in connection with the pH adjustment tank 26.

As best illustrated in FIG. 2, attached to treatment vessel 102 is a reactor sight tube assembly 110 similar in construction and operation as pH adjust sight tube assembly 32 associated with pH adjustment tank 26. Reactor sight tube assembly 110 includes a float 115, a low level or empty switch 111, a one-half full switch 112 and a full level switch 113.

Treatment vessel 102 is provided with a plurality of view ports 114 as illustrated in FIGS. 2, 3 and 4. To aid in viewing the contents of the vessel, a number of lighting sources can also be provided. An example of one such light source 116 is illustrated generally schematically in FIG. 3.

The treatment of the sludge contained in treatment vessel 102 is accomplished by delivering the sludge from the lower portion of the vessel to the upper portion of the vessel and dispersing it in small particles throughout the oxygen-rich atmosphere, preferably pressurized, in the upper portion of the vessel. This is accomplished as follows, with reference to the reactor assemblies illustrated in FIGS. 3 and 12. A similar treatment occurs with respect to reactor assemblies 300 and 500, but these will be described hereinafter with reference to FIGS. 13 through 19.

The main distinction between reactor assembly 100 as illustrated in FIG. 3 and reactor assembly 100' as illustrated in FIG. 12 is the means for delivering the sludge from the lower portion of the vessel to the upper portion of the vessel and in the orientation of the first dispersing means in the form of distributor head 130 (FIG. 3) and 130' (FIG. 12). With certain types and thicknesses of sludge, the alternate sludge dispersement means of FIG. 12 may be accomplished by inverting or turning over the first sludge dispersing means. The sludge would then be delivered to the top of the hyperbaric vessel to the first sludge dispersing means and then channelled through an angle greater than 90 degrees and then to the second dispersement means. The sludge delivery systems of FIGS. 3 and 12 will be described separately.

With reference to FIG. 3, sludge 106 is delivered by delivery means from the lower portion to the upper portion of the vessel. The delivery means includes a reactor circulation conduit 118 at the bottom of treatment vessel 102, a reactor circulation valve 120, a reactor circulation pump 122, a reactor circulation valve 123, and an internal reactor circulation conduit 124 having an upright portion 126 and a discharge end 128. Preferably, discharge end 128 is flared outwardly for reasons set forth hereinafter. Preferably, circulation pump 122 is driven by a hydraulic motor, to take advantage of the good control and infinitely adjustable variable speed associated with hydraulic motors. Valves 120 and 123 are remotely controlled. Further, additional valves can be included in the delivery means for backup, automatic, semi-automatic or manual control, if desired. Sludge 106 is pumped through conduit 118, conduit 124 and out the discharge end 128 against the first dispersing means in the form of distributor head 130.

With reference to reactor assembly 100' illustrated in FIG. 12, sludge 106' is delivered by delivery means from the lower portion to the upper portion of the vessel by an opening in the top of treatment tank 102', rather than through an opening in the side of the tank as illustrated in FIG. 3. Reactor circulation conduit 118', reactor circulation valve 120', reactor circulation pump 122' and reactor circulation valve 123' all may be of the same construction and have the same function as set forth above with respect to FIG. 3 and identified by like numerals but without the primed designation. From valve 123', the sludge enters recirculation conduit 125' which has a depending vertical portion 126' which passes through a packing gland 153'. Recirculation conduit 125' ends in a flared discharge end 128', equivalent to discharge end 128 of vertical portion 126 of recirculation conduit 124 relating to reactor 100. Sludge 106' then impinges against the first dispersing means in the form of distributor head 130'. In essence, distributor head 130' is an inverted form of distributor head 130.

Distributor head 130 is best illustrated in FIGS. 4 through 7. FIG. 4 is a plan view of distributor head 130 and shows its orientation with respect to the second dispersing means in the form of a plurality of rotor assemblies 160. Distributor head 130 can be described in detail most clearly with respect to FIGS. 5, 6 and 7.

Distributor head 130 preferably is generally circular in a plan view and is generally in the shape of an inverted cone in side view. In the sectional view of FIG. 7, distributor head 130 has a shape somewhat like an opened umbrella. In general, as referred to herein, the shape of distributor head 130 or 130' illustrated in the drawings will be called a cone. When distributor head 130 is used in the orientation illustrated in FIG. 3, it will be referred to as having a shape of an inverted cone. When distributor head 130 is inverted for use in reactor assembly 100' as distributor head 130' illustrated in FIG. 12, the shape of distributor head 130' will be referred to as having a shape of an upright cone.

Distributor head 130 includes a central hub 132 in which the tip 133 of the inverted cone is disposed downwardly. A threaded bore 134 is formed in the center of central hub 132 for distributor head 130 as used with reactor assembly 100 illustrated in FIG. 3. When inverted distributor head 130' is used in reactor assembly 100' illustrated in FIG. 12, the tip of the central hub is disposed upwardly and at least two bores 134' are formed in distributor head 130'. These bores are best illustrated in FIG. 12. Otherwise, the construction of distributor head 130' is substantially identical to distributor head 130. Accordingly, distributor head 130 will be described in detail.

For ease of assembly, disassembly and maintenance, distributor head 130 has a plurality of radial segments 136 surrounding and attached to central hub 132. Each radial segment 136 has a cavity 138 to allow for the attachment of segment 136 to central hub 132 by fasteners, such as bolts 140. The segments are attached to each other by means of fasteners 142, such as bolts and nuts. Cover plates 144 cover the cavity of each of the segments, so that the top surface of distributor head 130 is basically smooth.

The sludge is directed against the underside of distributor head 130 or the top surface of distributor head 130' adjacent the discharge end 128 or 128' of reactor circulation conduit 124 or 125' and separated into a plurality of streams by channel means. The channel means preferably are in the form of concave radial channels 146 formed in the undersurface of distributor head 130. Likewise, with reference to FIG. 12, concave radial channels 146' are formed in the upper surface of distributor head 130'. As illustrated in FIGS. 4 and 5, the preferred embodiment of the distributor head includes eight equally spaced concave radial channels 146. Although in the drawings radial channels 146 are illustrated as being of substantially the same depth throughout their length, they may vary in depth, if desired, preferably being more shallow at the inlet end proximate to the central hub 132 and deeper as they approach the outlet end at the perimeter of distributor head 130 or 130'. Where variable depth channels 146 or 146' are desired, it is preferred that at their shallow end near the tip of the cone portion of central hub 132, they converge with and are flush with the surface of the central hub.

The number of channels and their orientation, as well as the size of the distributor head can be determined based upon the quantity and consistency of sludge to be treated, the size of treatment vessel 102 or 102', and similar considerations. In the presently preferred embodiment illustrated in the drawings, distributor head 130 or 130' has a diameter of about 4½ feet and a height of about 15 inches from the base to the tip. Preferably, distributor head 130 is made of stainless steel.

The distributor head 130 or 130' is mounted within treatment vessel 102 or 102' for axial adjustment with respect to discharge end 128 or 128' of reactor circulation conduit 124 or 125', as well as adjustment with respect to rotor assemblies 160 or 160'.

The height of distributor head 130 is adjusted by means of a distributor head lift assembly 148, best illustrated schematically in FIGS. 2 and 3. The height of distributor head 130' is adjusted by means of distributor head lift assembly 148', as illustrated schematically in FIGS. 2 and 12.

The hydraulic control of distributor head lift assembly 148 which is identical for lift assembly 148', will be described hereinafter. Generally, however, the distributor head can be raised and lowered to account for different types and consistencies of sludge to be channelled by the distributor head within the upper portion of treatment vessel 102. Discharge end 128 of reactor circulation conduit 124 is flared so that the tip of inverted cone 133 of distributor head 130 can be received telescopically within discharge end of reactor circulation conduit 128 when the distributor head is fully lowered in the arrangement of FIG. 3, or when distributor head 130' is fully raised as illustrated in FIG. 12. To aid in channelling sludge 106 or 106' into radial channels 146 or 146', the flared discharge end 128 or 128' of reactor circulation conduit 124 or 125' contain notches 129 or 129' aligned with each of the channels. When notches 129 or 129' are used, they are preferably in the form of semicircles. The notches are of most use when the tip of the conical central hub of distributor head 130 or 130' is inserted into the discharge end of respective reactor circulation conduit 124 or 125.

Distributor head 130 or 130' is designed to cause a major portion of the sludge to travel through an angle greater than 90 degrees within the upper portion of the vessel toward a sludge comminuting and dispersing means, such as rotor assembly 160. By channelling the sludge through an angle greater than 90 degrees, the sludge will travel through a greater volume of the oxygen-rich atmosphere and be in contact therewith a greater time to aid oxygenation of the sludge compared to prior art systems. It is preferred that the sludge be channelled through an angle of about 180 degrees by distributor head 130 or 130'. Preferably, the sludge is pumped with sufficient force so that substantially all of the sludge is channelled through an angle greater than 90 degrees by the distributor head, but there may be occasions in which the sludge consistency is such that a lesser amount will be channeled due to capacity limitations of the equipment. In these circumstances, at least a major portion of the sludge will be so channeled.

With reference to FIG. 3, distributor head lift assembly 148 includes a shaft 150 extending through a packing gland assembly 152 formed in removable support plate 158. Plate 158 is secured to flange 105 by suitable fasteners, such as nuts and bolts, not illustrated. A gasket, also not illustrated, is located between the bottom of plate 158 and the top of flange 105 to provide an airtight seal. One end of shaft 150 is received within threaded bore 134 of distributor head 130. The other end of shaft 150 is connected in any suitable manner to a top bar or plate 154. Equally distributed around top bar or plate 154 is a plurality of driving means to raise and lower the bar or plate, the shaft and, ultimately, the distributor head. Preferably, the driving means are hydraulic cylinder lift means 156 which are secured to plate 158. Hydraulic cylinder lift means 156 include piston rods 159 attached to top bar or plate 154.

With reference to FIG. 12, distributor head lift assembly 148' includes a plurality of shafts, such as four, only two being illustrated, extending through packing gland assemblies 157' in removable support plate 158'. One end of each shaft 150' is received within each illustrated threaded bore of distributor head 130'. The other end of each shaft 150' is connected in any suitable manner to or is integral with a piston rod 159' or hydraulic cylinder lift means 156'. Hydraulic cylinder lift means 156' are attached in any suitable manner to support assembly 155', which in turn is secured to removable support plate 158'.

As the sludge leaves the confines of the channels, it is separated into particles as illustrated at 228 and 228' in FIGS. 3 and 12, respectively. The sludge particles interact with the oxygen-rich atmosphere in the upper portion of the vessel as they fall upon the second dispersing means which preferably further comminutes and substantially simultaneously disperses the sludge throughout the oxygen-rich atmosphere in the upper portion of the vessel.

The presently preferred embodiment of the second dispersing means is a plurality of rotor assemblies 160 or 160' oriented with respect to distributor head 130 or 130'. Since rotor assemblies 160' are identical to rotor assemblies 160, only the latter will be described in detail. One example of a presently preferred embodiment of a rotor assembly 160 is illustrated in greater detail in FIGS. 8 through 11.

Figure 8:
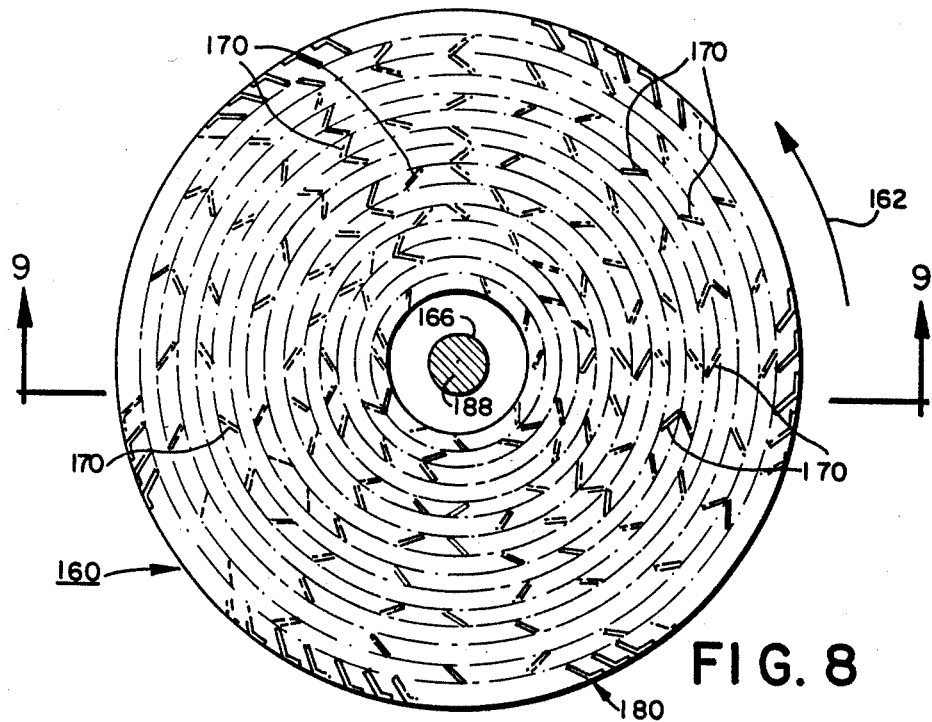
FIG. 8 is a plan view of one embodiment of the second dispersing means, in the form of a rotor assembly, for use in the invention.
Figure 9:
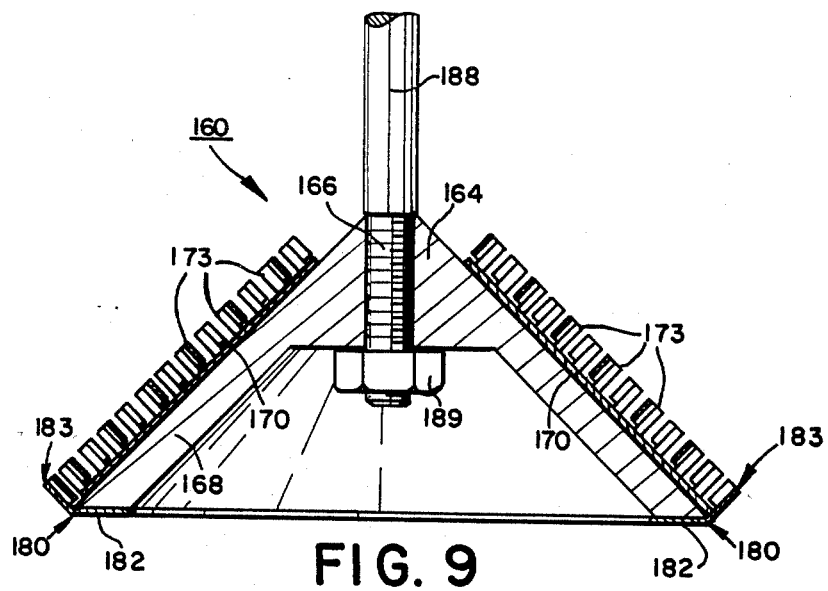
FIG. 9 is a vertical cross-sectional view of the rotor assembly taken along lines 9—9 of FIG. 8.

With reference to FIGS. 8 and 9, it is presently preferred that rotor assembly 160 be generally conical in shape. The illustrated rotor assemblies are to be driven by means set forth hereinafter in the direction indicated by directional arrow 162 in FIG. 8.

Rotor assembly 160 includes a body portion 164 through which a bore 166 is formed. It is a matter of choice whether the bore is threaded or unthreaded. A depending wall portion 168 extends from body portion 164.

The upper, outer surface of rotor assembly 160 as illustrated schematically in FIGS. 8 and 9 forms an impact surface against which sludge particles 228 (FIG. 3) impact. To aid in the comminution and dispersement of the sludge particles, the impact surface comprises a plurality of adjustable angled vanes 173 extending from a plurality of radial vane strips 170 disposed proximate the tip of the cone and extending radially toward the base of the cone, as best illustrated in FIGS. 8, 9 and 10.

It is also presently preferred to include a plurality of additional perimeter vanes 183 extending outwardly and generally perpendicularly from the upper surface of rotor assembly 160 and all along the perimeter of its base.

Radial vane strips 170, perimeter vane strips 180 and adjustable angled vanes 173 and perimeter vanes 183 extending therefrom, respectively, are illustrated in detail in FIGS. 10 and 11. Preferably, vane strips 170 are made of stainless steel. Vanes 173 can be formed at any desired angle, depending upon the consistency of the sludge, the speed and direction of rotation of rotor assembly 160, and the like.

For purposes of illustration, one presently preferred embodiment of a vane strip arrangement is illustrated in FIGS. 10 and 11. Radial vane strip 170 includes a flat strip forming a base member 171. Screws 172 or other suitable fasteners attach the vane strip to the rotor assembly. Extending generally perpendicularly from flat strip base member 171 are a plurality of adjustable angled vanes 173.

As presently preferred, each vane 173 includes a generally erect radial vane portion 174 and an erect bent or angled vane portion 176 or angled vane portion 178. Angled vane portion 176 is angled toward the direction of rotation. Angled vane portion 178 is angled away from the direction of rotation. Preferably, vanes having angled vane portions 176 alternate with vanes having angled vane portions 178 along radial vane strips 170. Angled portions 176 and 178 can be adjusted simply by bending them to any desired extent.

Perimeter vanes 183 are best illustrated in FIGS. 9 and 10. Perimeter vanes 183 are a part of perimeter vane strip 180. Strip 180 includes a base portion 182 attached by any suitable means, such as screws or other fasteners, to the outermost portion and bottom of depending wall portion 168 of rotor assembly 160, as most clearly illustrated in FIG. 9. Extending from base portion 182 are the perimeter vanes 183. Perimeter vanes 183 preferably are aligned so that they are generally perpendicular to the outer upper surface of rotor assembly 160. Each perimeter vane 183 includes a perimeter portion 184 and an angled portion 186. Angled portion 186 extends at an obtuse angle with respect to the perimeter portion 184. Stated in other words, the angled portion 186 extends at an acute angle away from the direction of rotation with respect to the radius of the cone base body portion 164.

Like distributor head 130 or 130', each rotor assembly 160 or 160' can have dimensions determined by the consistency and composition of the sludge, the size of the treatment vessel and the capacity of the system to handle the sludge. In the presently preferred embodiment, each rotor assembly has a base diameter of about 2 feet and a height of about 1 foot. Rotor assemblies 160 are oriented with respect to distributor head 130 or 130' so that concave radial channels 146 or 146' of distributor head 130 or 130' direct a stream of particles 228 or 228' of sludge whereby a major portion and preferably substantially all of the sludge impacts on the impact surface of the rotor assemblies.

When the sludge hits the rotor assemblies, it is further comminuted to form small sludge particles or droplets and is substantially simultaneously dispersed within the upper portion of the treatment vessel so that they become oxygenated as they interact with the oxygen in the upper portion of the vessel. Thus, the rotor assemblies cause a major portion and preferably substantially all of the sludge particles to travel through a second angle greater than 90 degrees, as illustrated by the path of the particles indicated as numerals 230 and 230' in FIGS. 3 and 12, respectively. Preferably, due to the impact of the sludge against the vanes of the rotor assemblies, the sludge S. 3 and 12, respectively. Preferably, due to the impact of the sludge against the vanes of the rotor assemblies, the sludge particles travel through an angle of about 180 degrees before they fall to and are collected in the lower portion of the vessel. Because two dispersing means are used in accordance with the present invention, the sludge is finely comminuted and completely dispersed in the oxygen-rich atmosphere of the upper portion of the vessel.

Each rotor assembly 160 or 160' is driven by driving means 190 or 190', best illustrated in FIG. 3 or FIG. 12, respectively. Since driving means 190' is identical to driving means 190, only the latter will be described in detail. With reference to FIG. 3, driving means 190 includes a rotor motor 192, preferably a hydraulic motor, due to its versatility and infinite adjustability. Motor 192 is connected to one end of a shaft 188. The other end of shaft 188 is connected to body portion 164 of rotor assembly 160 by any suitable means, such as by nut 189 or by a threaded bore 166, if desired.

Rotor motor 192 is supported by rotor support assembly 194 attached to treatment vessel 102. Shaft 188 passes through a rotor packing gland assembly 196 into vessel 102.

The speed and direction of rotation can be varied based on the characteristics of the sludge and the size and capacity of the treatment system.

The hydraulic drive means for distributor head lift assembly 148 or 148' and each rotor assembly drive means 190 or 190' will now be described in greater detail with reference to lift assemblies 148 and drive means 190 illustrated in FIGS. 1, 2 and 3, since the distributor head lift assemblies 148 and 148' are substantially identical and the rotor assembly drive means 190 and 190' are substantially identical.

As best illustrated in FIGS. 1 and 2, a hydraulic circulation pump 200 driven by an electric motor causes hydraulic fluid to flow through hydraulic pressure conduit 202, hydraulic pressure valve 203 and into hydraulic common pressure conduit 204 for distribution to reactor assembly 100 and/or 100'. The hydraulic fluid is directed to a hydraulic pressure manifold 206 associated with each reactor assembly.

From hydraulic pressure manifold 206, hydraulic fluid flows into lift inlet conduit 207, through remote controlled lift inlet valve 209 and into hydraulic cylinder lift means 156. Lift outlet conduit 211 extends from each hydraulic cylinder left means 156 and hydraulic fluid is returned through lift outlet conduit 211, through remote controlled lift outlet valve 213 and into hydraulic return manifold 216. By controlling the remote controlled valves, the direction and speed by which the distributor head is raised or lowered can be regulated precisely.

Hydraulic fluid also flows from hydraulic pressure manifold 206 into rotor inlet conduit 208, through remote controlled rotor inlet valve 210 and into rotor hydraulic motor 192 for driving each rotor assembly 160. Also connected to motor 192 is a rotor outlet conduit 212. Hydraulic fluid returns to hydraulic return manifold 216 through rotor outlet conduit 212 and remote controlled rotor outlet valve 214. Other valved conduits, not shown, may be provided by which hydraulic fluid is directed to opposite portions of motor 192 to cause the direction of rotation to be reversed, if desired. Again, by controlling the remote controlled rotor inlet valve 210 and remote controlled rotor outlet valve 214, the speed and direction of rotor hydraulic motor 192 can be regulated precisely.

Similar conduits and valves are used to create a hydraulic connection between the pressure and return manifolds with other hydraulic cylinder lift means 156 and rotor hydraulic motors 192 of the distributor head and rotor assemblies, respectively, associated with each reactor assembly. As with other valved conduits, other automatic, semi-automatic or manual valves can be part of the hydraulic fluid flow lines.

From hydraulic return manifold 216, hydraulic fluid flows into return conduit 218, then return conduit 220, through remote controlled hydraulic return valve 222 and into hydraulic reservoir 224. A conduit 226 connects reservoir 224 to electric motor driven hydraulic circulation pump 200 to complete the hydraulic fluid path.

The oxygen-rich atmosphere within the upper portion of each of the treatment vessels 102 and 102' preferably is also supplied through a manifold system as best illustrated in FIGS. 1, 2, 3 and 12. While some activation of the sludge would occur in an atmosphere of air, the sludge becomes more highly activated and more completely treated when small sludge particles fully interact with an oxygen-rich atmosphere. It is also presently preferred to use a pressurized oxygen-rich atmosphere, by which oxygenation occurs still more quickly and completely.

As used herein, the terms "oxygen" and "oxygen-rich atmosphere" mean that the atmosphere contained in the upper portion of the treatment vessel is substantially comprised of oxygen in the form of $O_2$ gas and/or $O_3$ gas (ozone). It is presently preferred to have a mixture of $O_2$ and $O_3$ in the proportion of about 90–95% by volume $O_2$ and 5–10% by volume $O_3$. The presently preferred pressure range is from about 45 pounds per square inch guage (p.s.i.g.) to about 65 p.s.i.g. It is believed that 60 p.s.i.g. is the optimum pressure to be used in accordance with the present invention.

A description of the $O_2$ and ozone supply and gas outlet and pressure relief components of the present invention will now be described with reference to FIGS. 1, 2 and 3.

$O_2$ from a source, such as a liquid oxygen tank (not shown) is pumped through $O_2$ supply conduit 232 and remote controlled $O_2$ inlet valve 234 into an $O_2$ manifold 236 associated with each treatment vessel 102. Along the length of $O_2$ manifold 236 are several $O_2$ entry ports, two of which are indicated schematically as 238 and 239 in FIG. 3, through which $O_2$ flows into the upper portion of treatment vessel 102. Ozone is generated by any conventional ozone generator, not illustrated. The ozone is then pumped through $O_3$ supply conduit 240, through remote controlled $O_3$ inlet valve 242 and into $O_3$ manifold 244. $O_3$ entry ports, two of which are shown at 246, 247 in FIG. 3, allow the ozone to enter the upper portion of treatment vessel 102.

To flush the upper portion of any undesirable gas and to release the gas pressure within treatment vessel 102, there is provided an outlet conduit 248 and a remote controlled outlet or bleed-off valve 250. Outlet conduit 248 can be vented to the atmosphere, to pollution control equipment, or to other storage or treatment means not directly relevant to the present invention. A pressure relief valve 254 is connected by pressure relief conduit 252 to the upper portion of the treatment vessel. The threshold of the pressure relief valve can be adjusted depending upon the particular circumstances involved in the treatment system. A pressure sensor 256 includes pressure sensing means and signal generating means of conventional design to indicate the pressure within the upper portion of treatment vessel 102.

With the foregoing description and explanation of the operation of reactor assemblies 100 and 100' illustrated in FIGS. 3 and 12, respectively, as background, the description of two alternate embodiments of an apparatus according to the present invention will be described, first with respect to FIGS. 13 through 16, and then with respect to FIGS. 17 through 19. In essence, the reactor assemblies and components thereof illustrated in FIGS. 13 through 19 have a similar function as the reactor assemblies and components illustrated generally in FIGS. 3 and 12. For this reason, the last two digits of the identifying numerals of FIGS. 13 through 19 correspond generally to the last two digits of the identifying numerals in FIGS. 3 and 12. The entire descriptions of identical components therefore will not be repeated with respect to the embodiments of FIGS. 13 through 19. Identifying numerals are included in the embodiments of FIGS. 13 through 19 for ease of reference during examination, though all elements so identified are not described in detail.

FIG. 13 illustrates reactor assembly 300 corresponding generally to reactor assemblies 100 or 100'. The composition of the sludge, its viscosity, solids content, etc., will determine which of several types of reactor assemblies is best used in a particular situation. Reactor assembly 300 includes a treatment vessel 302 supported on a foundation by support members 304. As with treatment vessels 102 and 102', vessel 302 preferably is hyperbaric and may be made in shapes other than that illustrated. Sludge 306 enters the lower portion of the vessel through inlet conduit 58. The sludge is mixed by mixer 308 and is delivered from the lower portion of the vessel to the upper portion by a pump through a series of conduits.

Sludge 306 travels through a reactor circulation conduit 118, reactor circulation valve 120, reactor circulation pump 122 and reactor circulation valve 123 into internal reactor circulation conduit 324. The sludge then passes through elbow conduit 325 connected at one end by flanges to inlet conduit 324 and at another flanged end to upright delivery conduit 326. Conduit 326 is attached via a flanged outlet end to a first or lower section 331 of a first dispersing means or distributor head 330. To support conduits 324, 325, 326 and lower section 331 of first sludge dispersing means 330, a support structure is provided, preferably centrally located within vessel 302.

The support assembly includes flanged support members 327 attached to flanged elbow 325 at one end and to flanged support member 329 at the other end. Support member 329 is welded or otherwise secured in any suitable manner to the bottom of the treatment vessel.

As described in more detail hereinafter, first sludge dispersing means or distributor head 330 comprises two sections, a first or lower section 331, and a second or upper section 332. Channelling means are formed between lower section 331 and upper section 332 of distributor head 330. The channelling means take the form of a plurality of channels 339 which preferably, and as illustrated, converge to form a single or common inlet passageway toward the bottom of lower section 331. The upper portions of channels 339 diverge in a generally radial pattern. Sludge entering the lower portion of channels 339 is dispersed from the channel outlets, preferably through nozzle assemblies 343, such that a major portion of the sludge is directed toward and impacted against a plurality of second dispersing means or deflector members 360 aligned with the outlets of the channels. Deflector members 360 are adjustably attached to the inner peripheral walls of treatment vessel 302 by any suitable means, such as by ball and socket assemblies 366, 368 to which they are mounted through mounting shaft 364 which is retained by threaded bore 362.

The dotted lines in the upper portion of treatment vessel 302 generally illustrate the flow path of sludge from first sludge dispersing means 330 to second sludge dispersing means 360 by which the sludge is dispersed in the form of streams and fine particles throughout the upper portion of the vessel until the particles fall by gravity to sludge pool 306 in the bottom portion of the vessel. As illustrated, when the sludge is pumped through distributor head 330, it leaves as streams of particles 428 directed toward deflector members 360. Preferably, the sludge is directed by nozzle assemblies 343 toward the center of deflector members 360 where a generally conical tip extends from centrally converging portions of the concave face of the impact surface of the deflector members. The sludge is then distributed throughout the concave face and against radial vanes to be described hereinafter which further divide and comminute the sludge into small particles. Because of the force with which the sludge impacts deflector members 360, the sludge is dispersed as illustrated by streams 430 throughout the upper portion of the treatment vessel. In this way, the sludge is fully oxygenated by oxygen and/or ozone.

Although sludge spray and particle lines 428 and 430 generally show some typical dispersal patterns, it will be apparent to those skilled in the art that the indicated streams of particles are only exemplary and do not purport to show the exact or all-possible streams resulting from the operation of reactor assembly 330.

To tune the reactor to different types and viscosities of sludge and to purge the channelling means of any blockage, the distance between, and therefore the size of the channels between, lower section 331 and upper section 332 of distributor head 330 is adjustable. As illustrated best in FIG. 13, one end of a shaft 350 is attached to upper section 332. The other end of shaft 350 is attached to a lift bar or plate 354. The lift bar or plate is raised or lowered by activating hydraulic lift means secured to the cylinder mounting plate 358. Thus, hydraulic cylinders 356 are mounted to plate 358 and hydraulic cylinder piston rods 359 are attached to the underside of lift bar or plate 354. To raise lift bar or plate 354, and therefore shaft 350 and upper section 332 of distributor head 330, pressurized hydraulic fluid flows from pressure manifold 406 through conduit 407 and remote controlled lift inlet valve 409 into hydraulic cylinder lift means 356. Lift outlet conduit 411 extends from each hydraulic cylinder 356 and hydraulic fluid is returned through lift outlet conduit 411, through remote controlled lift outlet valve 413 and into hydraulic return manifold 416. By controlling the opening and closing of the remote controlled valves, upper section 332 of distributor head 330 reciprocates away from and toward lower section 331.

Figure 14:
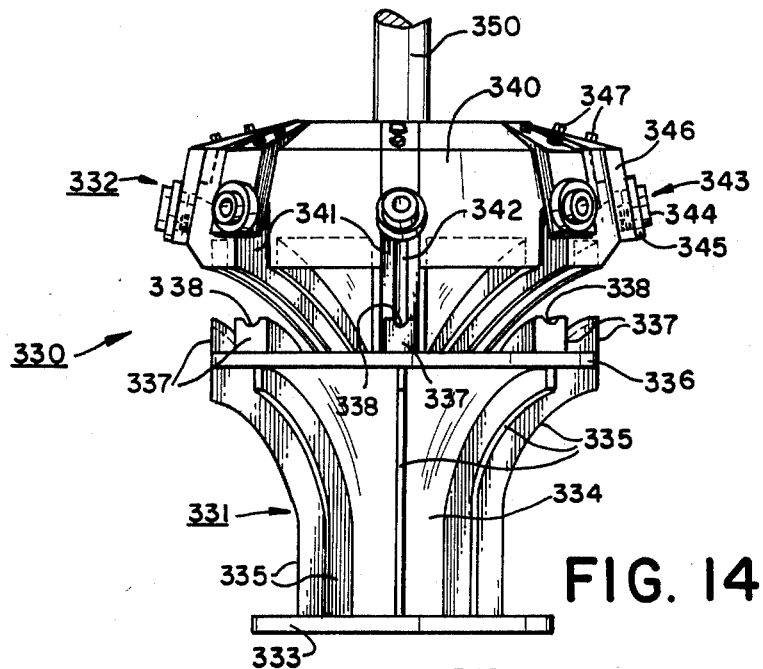
FIG. 14 is a side elevational view of another embodiment of a first sludge dispersing means used in the embodiment illustrated in FIG. 13.
Figure 15:
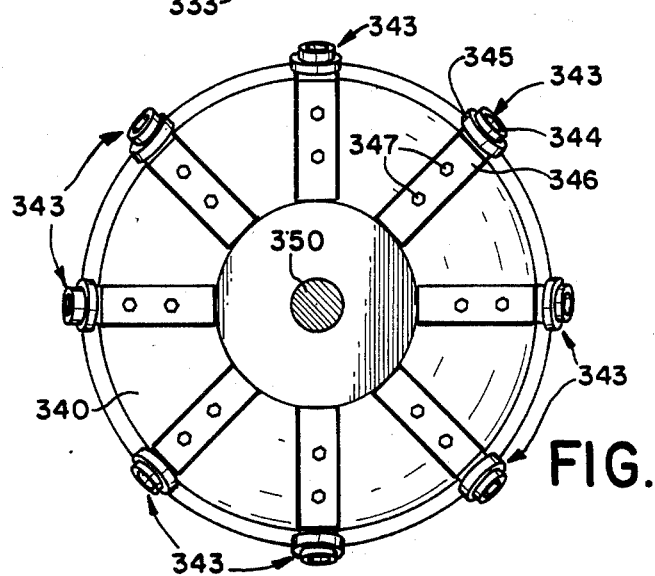
FIG. 15 is a plan view of the first sludge dispersing means illustrated in FIG. 14.

The first sludge dispersing means or distributor head 330 is illustrated in more detail in FIGS. 14 and 15. FIG. 14 is a side elevational view of distributor head 330 with upper section 332 shown in raised position with respect to lower section 331. Each of the sections 331 and 332 of the distributor head may be made by casting or machining a single piece of material, preferably stainless steel. Any other suitable fabrication technique or material may be used. Lower section 331 includes a mounting flange 333 which is attached to the outlet mounting flange of delivery conduit 326 by nuts and bolts, for example. The lower section includes a hollow housing 334 extending from flange 333. Support ribs 335 add extra strength to support both the housing and a platform portion 336.

A plurality of male channel elements 337 are formed on top of platform portion 336 and within housing 334. The height of the male channel elements 337 may be made to diminish as the channel elements enter the hollow vertical portion of housing 334 preferably to form a single inlet passageway within the housing. A lower channel portion 338 preferably is formed within the upper surface of each male channel element 337. Male channel elements 337 and associated lower channel portions 338 preferably are arranged in a radial pattern approximately equidistant from each other. Preferably, there are eight such channel elements and channel portions, although a lesser or greater number and different arrangements, such as a curved, rather than a radial arangement, may be used in any particular embodiment, depending upon the size of the treatment vessel, the type of sludge, etc.

Upper section 332 of distributor head 330 may be made in a manner and preferably of materials identical or similar to lower section 331. Upper section 332 includes a housing 340 into which are formed a plurality of female channel recesses 341. The number and arrangement of recesses 341 may be varied so long as each recess mates with a male channel element 337 of lower section 331. As illustrated best in FIG. 14, female channel recesses 341 are deeper at their outlet ends adjacent the outer periphery of housing 340 and are shallower toward the lower central portion of housing 340. This is to aid in defining the single or common inlet passageway and the beginning of channels 339 within and toward the bottom of lower section 331. Preferably formed within the upper surface of each of female channel recesses 341 is an upper channel portion 342, which, like lower channel portion 338, may be semicircular or any other suitable shape in cross section.

When upper section 332 is lowered to be directly adjacent to lower section 331, such that male channel elements 337 mate fully with female channel recesses 341, lower channel portions 338 and upper channel portions 342 together form channels 339 (best illustrated in FIG. 13). While it is presently preferable in this embodiment of the present invention to include channel portions both in male channel elements 337 and female channel recesses 341, it is not absolutely necessary to do so. Channels 339 may be created solely by adjusting the distance by which the male elements extend into the female recesses, and/or by forming channel portions 338 or 342 in only one of the series of male channel elements 338 or female channel recesses 341.

Also preferably assocated with upper section 332 are a plurality of nozzle assemblies 343, with each nozzle assembly being aligned with and directly adjacent to the outlet end of each female channel recess 341. Depending on the type and viscosity of the sludge, the nozzle assemblies, which include adjustable nozzle elements, help direct the stream of sludge particles within the upper portion of treatment vessel 302, preferably toward the deflector members 360.

Nozzle assemblies 343 comprise an outer nozzle member 344 adjustably secured to inner nozzle member 345, such as by threading the outer member into the inner member. Inner member 345 is secured to an angled mounting bracket 346 in any suitable manner, such as by a threaded connection. Mounting bracket 346 in turn is attached to housing 340 by bolts or screws 347 which are screwed into threaded mounting holes (not shown) in housing 340. In the usual fashion, at least one of nozzle members 344 and 345 includes an impact surface against which the sludge exiting from channels 339 impacts to form narrow or wide sludge particle streams. By controlling the relative displacement of the inner and outer nozzle elements, the spray or stream of sludge dispersed from distributor head 330 can be controlled.

Figure 16:
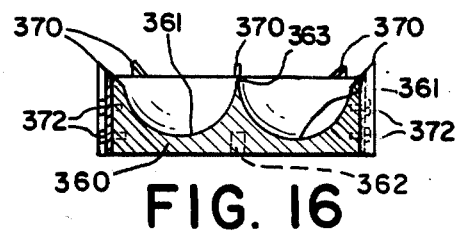
FIG. 16 is a vertical cross-sectional view of an embodiment of a second sludge dispersing means as illustrated in FIG. 13.

The details of a second dispersing means or deflector member 360, except for the standard ball and socket mounting means, are best illustrated in FIG. 16. Deflector member 360 includes an impact surface having a concave face 361 converging centrally to form a generally conical tip 363 extending from the face. The ball and socket support shaft 364 is screwed into threaded bore 362.

Mounted on the outer periphery of deflector member 360, and extending beyond (above in FIG. 16) the plane formed by the edges and tip of the face of the deflector plate, are a plurality of vanes 370. The vanes are angled and preferably are formed in a manner similar to the angled perimeter vanes 183 of the previously described rotor assembly embodiment of second dispersing means 160 best illustrated in FIGS. 9 and 10. Perimeter vanes 170 may be formed by bending a portion of a vane strip extending around the perimeter of deflector member 360 and secured thereto by bolts or screws 372 retained in threaded bores formed within the deflector member.

The placement and adjustment of deflector members 360 may be selected based upon the size and shape of treatment vessel 302, the type and characteristics of the sludge to be treated, the velocity of the sludge exiting distributor head 330, and other engineering determinations so long as they are aligned to be impacted by a major portion of the sludge exiting from channels 339. While the deflector members are illustrated in FIG. 13 as being attached to the inside wall of the treatment vessel by adjustable ball and socket mounting elements, they need not be so attached. Other alternative arrangements include, for example, the attachment of the deflector members to separate supports within the vessel such that the deflector members are located either at the same level or, more beneficially, at a level lower than distributor head 330, such that when the sludge particles impact on the central portion of the deflector members near tip 363, the sludge will be directed both outwardly and upwardly and comminuted by angled vanes 370 to achieve a greater retention time within the upper portion of the treatment vessel.

Another embodiment of the reactor assembly is illustrated as reactor assembly 500 and the related components illustrated in FIGS. 17 through 19. Reactor assembly 500 is most similar to reactor assembly 300. The first dispersing means or distributor head 530 used with reactor assembly 500 and illustrated in FIGS. 17 through 19 is substantially identical to first dispersing means or distributor head 330 used with reactor assembly 300 as illustrated in FIGS. 13 through 15. As before, unless otherwise noted, the last two digits of components of reactor assembly 500 correspond to like components of the previously described alternate embodiments of the reactor assemblies.

With reference to FIG. 17, reactor assembly 500 includes treatment vessel 502 containing sludge 506 in a lower portion. The sludge is circulated from the lower portion to the upper portion by a pump and through conduits and valves in a manner identical to that described with respect to reactor assembly 300. The sludge is delivered from delivery conduit 526 to first dispersing means or distributor head 530 which includes channelling means defined by channels 539 formed between first or lower section 531 and second or upper section 532. As the sludge exits the outlets of channels 539, the sludge is directed against a plurality of adjustable second dispersing means or deflector assemblies 543 which are mounted upon distributor head 530. When the sludge impacts against the deflector assemblies 543, streams of sludge particles are formed and dispersed throughout the upper portion of treatment vessel 502. Exemplary sludge particle streams are identified as stream 628 being deflected from deflector assemblies 543 and as 629 when they are deflected from the inner walls of treatment vessel 502. The deflector assemblies include deflector elements with a body having an impact surface for directing a portion of the sludge exiting the channels generally upwardly and outwardly toward the walls of the vessel.

Figure 18:
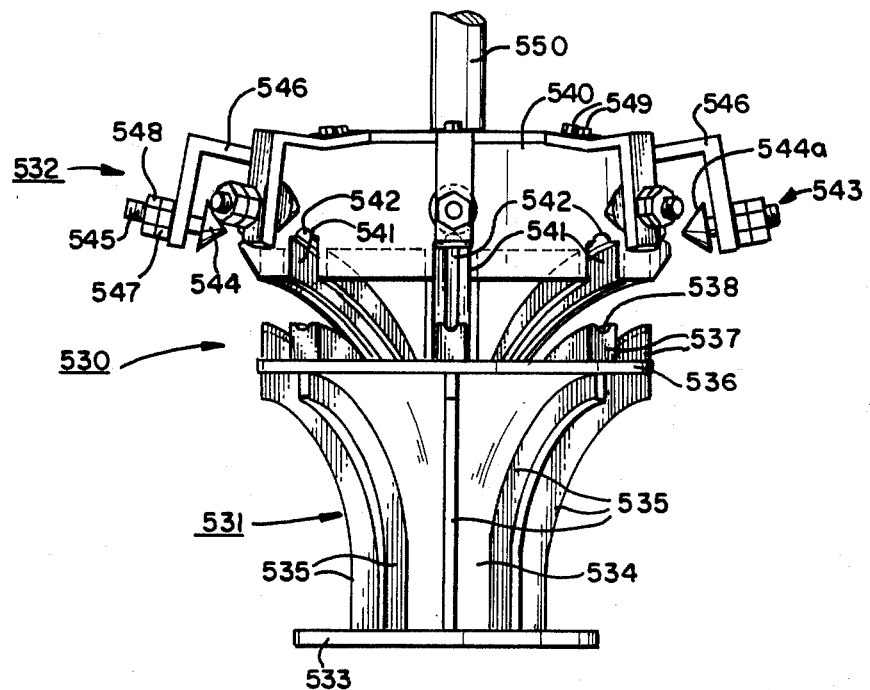
FIG. 18 is a side elevational view of the first sludge dispersing means used in the reactor assembly of FIG. 17 and also illustrating the attachment of the second sludge dispersing means to the first sludge dispersing means.
Figure 19:
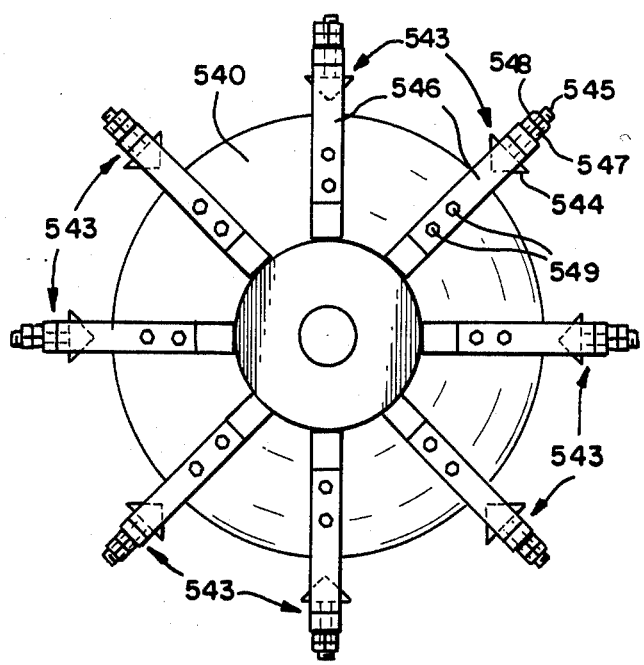
FIG. 19 is a plan view of the first and second sludge dispersing means illustrated in FIG. 18.

The details of first dispersing means or distributor head 530 and second dispersing means or deflector assemblies 543 are best illustrated in FIGS. 18 and 19. FIG. 18 shows the upper section 532 raised and thereby separated from lower section 531 of distributor head 530. As indicated above, the structure and operation of distributor head 530 is substantially identical to first dispersing means or distributor head 330 described with respect to FIGS. 13 through 15, with the exception of nozzle assemblies 343 associated with distributor head 330. Accordingly, a detailed description of distributor head 530 is believed to be unnecessary to one of ordinary skill in the art in view of the prior description.

Reactor assembly 500 utilizes an alternate embodiment of a second dispersing means compared to the second dispersing means of reactor assembly 300. Each of deflector assemblies 543 comprises a deflector element or body 544 preferably having a conical shape. The sides of conical deflector element form impact surfaces 544a against which sludge pumped through distributor head 530 impact. While a conical shape is not required, it is preferred, since this shape assures that at least about 50% of the sludge stream impacting surface 544a will be deflected upwardly toward the top wall of the treatment vessel and a greater percentage will be deflected outwardly toward the side walls of the treatment vessel. The conical sidewalls also aid in providing a uniform dispersal of the sludge throughout the upper portion of the treatment vessel.

Deflector element 544 is attached to a shaft 545 which is used for mounting and adjustment purposes. Shaft 545 may be formed integrally with deflector element 544 or may be fastened thereto by threaded connection, welding, adhesive bonding or any other suitable fastening means. The other end of shaft 545 is threaded and extends through a threaded bore in an angled portion of mounting bracket 546 as illustrated.

An adjustment nut 547 and a lock nut 548 are used to adjust the proximity of deflector element 544 to the outlet end of channels 539 formed in distributor head 530. The angle and dispersion of the sludge particle stream is thereby adjustable.

Mounting brackets 546 are attached to the first or upper section 532 by any suitable fastening means, such as bolts 549, for example. While it is possible to attach mounting brackets 546 to first or lower section 531 of distributor head 530, it is preferable to attach them to the upper section to aid in clearing jams at or near the outlet end of channels 539 by raising the upper section and deflector assemblies together. As with the embodiment of the reactor assembly 300, the distance between the upper and lower sections of distributor head 530 can be adjusted by lifting means 556 to tune the dispersal of sludge through the channelling means of the distributor head based upon the characteristics of the sludge and other operating parameters.

A description of the operation and control of the entire sewage sludge treatment system will now be described in detail.

As set forth hereinbefore, the components of the present invention preferably are interrelated to a local control station 80 for controlling the operation of input of sludge to be treated, treated sludge output, hydraulic mixing, driving and pumping means, $O_2$ and $O_3$ supply means, gas outlet means, and the like. The local control stations preferably are controlled by a master control station, including data processing means. A general description of the operation of the system according to the present invention, as controlled by the local and master control stations and data processing means follows.

When pH adjustment tanks 26 and/or 26' are empty, a signal is generated to activate sludge pump 16 and to open remote controlled sludge valve 20 to allow sludge to be pumped from sludge holding tank 12. The sludge is directed either to pH adjustment tank 26 or 26' by opening the appropriate remote controlled pH adjust inlet valve 24 or 24'. At the same time, remote controlled reactor inlet master valve 54 from the pH adjustment tank 26 is closed. Assume that remote controlled pH adjust inlet valve 24' is closed and remote controlled pH adjust inlet valve 24 is opened so that sludge is pumped into pH adjustment tank 26. At this time, sight tube valves 34 and 36 are opened, as is remote controlled air valve 48. The pH sampling valve 31 and valve 54 are closed. As tank 26 is filled, the sludge level is visible in pH adjust sight tube 32. When the tank is full, float 37 energizes full level switch 42 which deactivates sludge pump 16 and closes inlet valve 24 and air valve 48.

At this time, the hydraulic powered pH adjust mixer drive 44 is activated and remote controlled acid valve 29 is opened to allow a premeasured amount of acid to be pumped from a storage vessel (not shown) into pH adjustment tank 26. Sampling valve 31 is opened and the pH is sampled. This procedure is repeated until the appropriate pH for the particular sludge and treatment conditions is reached. After the pH of the sludge is adjusted, the reactor assemblies are filled as follows.

Remote controlled air valve 48 is opened and remote controlled reactor inlet valves 60' to reactor assemblies 100', 100A and 100B are closed so that sludge can be directed to reactor assembly 100. Depending on the capacity of the system, sludge could also be directed to one or more other reactor assemblies simultaneously, if desired. For the sake of convenience, the following description refers to reactor assembly 100. Remote controlled reactor outlet valve 64 for reactor assembly 100 is closed. Remote controlled outlet or bleed-off valve 250 is opened, as is remote controlled reactor inlet valve 60 and remote controlled reactor inlet master valve 54. Reactor outlet pump 52 is activated to pump the pH adjusted sludge into treatment vessel 102.

The reactor assembly sight tube valves are opened and the level of sludge within the treatment vessel is indicated by the float and the series of low level switch 111, one-half full level switch 112 and full level switch 113.

In the preferred embodiment illustrated, one pH adjustment tank 26 contains sufficient pH adjusted sludge to fill two treatment vessels. It is clear that the system could be designed so that the volume of pH adjustment tank 26 corresponds with any number of reactor assemblies. However, in the preferred embodiment, when float 37 activates one-half full level switch 40, it is an indication that treatment vessel 102 reactor assembly 100 is filled. This can be confirmed by the indication obtained when full level switch 113 on reactor assembly 100 is energized. When treatment vessel 102 is filled, remote controlled reactor inlet valve 60 is closed.

Next, the treatment vessel for reactor assembly 100' is filled in a manner similar to the filling of the treatment vessel for reactor assembly 100 just described. In the preferred embodiment, the filling procedure is deactivated when empty level switch 38 of pH adjustment tank 26 is energized by float 37. This would correspond to a full indication by the full level switch associated with reactor assembly 100'. When the treatment vessel for reactor assembly 100' is filled, remote controlled reactor inlet valve 60' is closed. At this time, the pH adjustment tank is ready to be refilled as set forth above.

The description of the operation for reactor assembly 100 set forth above and as follows is exemplary of the operation of reactor assemblies 100', 100A, 100B, 300, 500, and any other reactor assemblies associated with the treatment system according to the present invention. Therefore, the operation of only one such assembly will be described in detail, with the understanding that the operation may be repeated simultaneously or sequentially with respect to the other reactor assemblies.

As explained hereinbefore, when the lower portion of treatment vessel 102 is filled with acidified sludge, there is still an upper portion below the level of the discharge end 128 of conduit 124 which is above the level of the sludge. The oxygen-rich atmosphere is created in this upper portion.

To create the oxygen-rich atmosphere, remote controlled outlet or bleed valve 250 is opened, as is remote controlled $O_2$ inlet valve 234. Oxygen in the form of $O_2$ is pumped into the upper portion of treatment vessel 102 and the air or other gas previously contained in the upper portion is flushed out through valve 250. After a suitable period of time and after substantially all air has been purged or removed from treatment vessel 102, valve 250 is closed. $O_2$ is pumped into the upper portion until the pressure reaches a predetermined point, such as about 30 p.s.i.g. to about 45 p.s.i.g., and more particularly, 40 p.s.i.g., for example. At that time, $O_2$ inlet valve 234 is closed and if treatment by $O_3$ is desired, remote controlled $O_3$ inlet valve 242 is opened. Oxygen in the form of ozone is then pumped into the upper portion until the pressure sensor indicates a higher predetermined pressure, such as about 40 p.s.i.g. to about 65 p.s.i.g., and more particularly 60 p.s.i.g., for example, is reached.

When the predetermined pressure is reached, several functions are designed to occur automatically and substantially simultaneously. $O_3$ inlet valve 242 is closed, hydraulic motor driven circulation pump 122 is activated, and remote controlled reactor circulation valves 120 and 123 are opened, as are remote controlled rotor inlet valve 210 and remote controlled rotor outlet valve 214 to the hydraulic motors 192 for rotor assembly 160. Likewise, reactor hydraulic motor driven mixer 108 is started. This begins the actual processing of the sludge.

Simultaneously, by means of a timer associated with the data processor, the processing time is recorded and may be displayed in a digital readout, such as a L.E.D. or L.C.D. display and/or a printer. Likewise, the date and time the treatment process began, the pressures involved, the source and composition of the sludge, and any other data which are desired can be recorded.

The actual processing of the sludge is controlled by the local control station 80. When reactor circulation pump 122 is activated, sludge is pumped from the lower portion of treatment vessel 102 by pump 122 through the discharge end 128 of reactor circulation conduit 124 and against the undersurface of distributor head 130 with sufficient force so that a plurality of sludge streams are created and channelled through concave radial channels 146. The sludge begins to interact with the oxygen-rich atmosphere as soon as it is discharged from reactor circulation conduit 124. A major portion and preferably substantially all of the sludge is channelled through an angle of greater than 90 degrees, and preferably about 180 degrees, until it impacts as a stream of particles 228 on the impact surface of rotor assemblies 160. Adjustable angled vanes 173 and perimeter vanes 183 on each rotor assembly 160 further comminute and substantially simultaneously disperse throughout the upper portion of the vessel a major portion and preferably substantially all of the sludge particles. The particles travel through a second angle greater than 90 degrees, and preferably about 180 degrees, so that they interact with and become oxygenated in the upper portion of the treatment vessel. Eventually, the oxygenated sludge particles fall and are collected within the lower portion of the vessel.

During the treatment process, samples of the processed sludge will be taken from the vessel through a sampling conduit 258 and sampling valve 260. The sludge will be subjected to testing to determine if it is substantially completely oxygenated. It is believed that the optimum time for processing the sludge within the preferred embodiments of reactor assembly 100, 100', 300 or 500 described herein would be from about 30 minutes to about 120 minutes. It is believed that the optimum treating time would be about 60 minutes. The actual time depends on a myriad of factors, all of which could be collected and analyzed to create a base of information on which further fully automated runs could be developed.

During treatment, the pressure within the upper portion of treatment vessel 102 is maintained automatically at an average of about 60 p.s.i.g., for example. When pressure sensor 256 records a pressure of 64 p.s.i.g., for example, remote controlled outlet valve 250 is automatically opened to reduce the pressure to 56 p.s.i.g., for example. If the pressure should fall, $O_2$ and/or $O_3$, based upon the results of the testing of the sludge, is pumped into the upper portion as desired.

The use of a local control station which controls the operation of a limited number of reactor assemblies, such as two reactor assemblies 100 and 100', enables the precise control and optimization of the processing parameters either automatically, or in a semi-automatic or manual mode.

The parameters are adjustable throughout the processing of the sludge. For example, when the processing begins, remote controlled rotor inlet valves 210 associated with each rotor assembly drive rotor hydraulic motor 192 are opened, as are remote controlled rotor outlet valves 214, to provide for the rotation of rotor assemblies 160 at a predetermined speed and direction. Both the speed and direction of rotation can be changed if and when desired automatically, semi-automatically or manually in response to signals based on elapsed processing time, chemical determinations made concerning the condition of the treated sludge, observation of the sludge through view ports 114, or the like. Rotor assemblies 160 can be controlled individually or as a group.

Likewise, when the processing begins, or any time during the processing, remote controlled lift inlet valve 209 associated with each of the hydraulic cylinder lift means 156, as well as the associated remote controlled lift outlet valve 213 are opened to adjust the height of distributor head 130 with respect to the discharge end 128 of reactor circulation conduit 124 and with respect to rotor assemblies 160. When an appropriate height is reached, the valves are closed and the distributor head is maintained in the appropriate orientation.

Another feature of the optimizing procedure is to be able to control the flow of sludge through the delivery means by remote controlled reactor circulation valves 120 and 123 and/or by varying the speed of reactor hydraulic motor driven circulation pump 122 in the sludge delivery means from the lower portion to the upper portion of treatment vessel 102.

The ability to adjust the angled vane portions 174 and 176 of adjustable angled vanes 173 and the angled portion 186 of perimeter vanes 183 on rotor assemblies 160 or the adjustment of vanes 370 on deflector members 360 is another characteristic of the present invention which allows for optimizing the processing of the sludge.

The ability to control and interrelate the operation of all the components in an individual reactor assembly allows for the optimum treatment and processing of various kinds of sludges. The ability to program the data processor and controller of the local control station with information relating to the composition of the starting materials, the processing time, the speed and direction of the rotor assemblies, the height of the distributor head or the distance between the sections of the distributor head, the condition of the valves and pump associated with the sludge delivery means, and the like, provide the ability to generate data bases which can be analyzed, recorded, modified and/or recalled to aid in the processing of similar or other types of sludge. Likewise, the use of a master control station which records data from and controls the operation of multiple reactor assemblies 100, 100', 100A, 100B, 300, 500, etc., and their associated local control stations, provides for ultimate total waste treatment plant control. The master controller and data processor also can monitor parameters from each and all reactor assemblies and local control stations concerning pressure, the amount of sludge in sludge holding tank 12 and in the pH adjustment tanks, as well as within each reactor assembly, the use of $O_2$, ozone, acid, electrical power, and make periodic totals and computations, such as daily, weekly, monthly and annually, and record, analyze, control and/or display other such functions and statistical information to provide for the cost effective and efficient treatment of all types of sludge.

When the sludge is fully treated in accordance with the specifications of the particular type of sludge, community standards, and the like, the treated sludge is removed from the reactor assemblies as follows. Remote controlled outlet valve 250 is opened and reactor mixer 108 and reactor circulation pump 122 are deactivated. Remote controlled reactor outlet valve 64 is opened, as is remote controlled valve 72. Pump 70 is activated and the treated sludge is pumped from reactor assembly 100 to tank or unit 76 for further treatment or disposal as described above. When the float within reactor sight tube 110 of reactor assembly 100 energizes low level switch 111, remote controlled reactor outlet valve 64 is closed. If sludge has been treated in reactor assembly 100' and if the treatment is completed as determined by the local control station, remote controlled reactor outlet valve 64' of reactor assembly 100' is opened to empty the treated sludge from that reactor assembly into tank or unit 76. When the empty switch of reactor assembly 100' is energized, pump 70 is deactivated and valves 64' and 72 are closed. Reactor assemblies 100 and 100' are then ready for recycling.

The present invention may be embodied in other specific forms without departing from the spirit or the central attributes thereof and, accordingly, reference should be made to the appended claims, rather than to the foregoing specification as indicating the scope of the invention.

I claim:

1. Apparatus for use in a sewage sludge treatment system comprising means for enhancing the surface area of the sludge to be treated and the time of interaction of finely divided sludge particles with oxygen-rich atmosphere including a vessel including sludge inlet means for conveying sludge to the vessel to be accumulated in a lower portion of the vessel, a sludge delivery means having a discharge end for delivering the sludge from the lower portion to an upper portion of the vessel, oxygen inlet means for delivering oxygen to the upper portion of the vessel, sludge outlet means for removing sludge from the lower portion of the vessel, and gas outlet means for removing gas from the upper portion of the vessel, first sludge dispersing means and a plurality of second sludge dispersing means located within the upper portion of the vessel, the first sludge dispersing means being generally axially aligned with and attached to the discharge end of the sludge delivery means, the first sludge dispersing means including a plurality of channelling means for channelling the sludge from the sludge delivery means through outlets in the first sludge dispersing means toward the second sludge dispersing means, each of the second sludge dispersing means being generally aligned with a channelling means of the first sludge dispersing means so that a major portion of the sludge being channelled from the first sludge dispersing means impacts against the second sludge dispersing means for dividing the sludge into fine particles and dispersing the sludge particles within the upper portion of the vessel to become oxygenated as they interact with oxygen in the upper portion of the vessel, the oxygenated particles falling to and being collected in the lower portion of the vessel.

2. Apparatus according to claim 1 wherein the first dispersing means comprises a first section attached to the discharge end of the sludge delivery means and a second section axially aligned with and separable from the first section.

3. Apparatus according to claim 2 further comprising a plurality of male elements extending from one of the first and second sections alignable within a corresponding plurality of female recesses formed within the other of the first and second sections, the channelling means comprising a channel formed within and along the length of at least one of the male elements and female recesses.

4. Apparatus according to claim 3 wherein the male elements extend from the first section, the female recesses are formed in the second section, channels are formed within and along all of the male elements and female recesses, and wherein the plurality of channels converge toward the interior of a lower base portion of the first section to form a single inlet passageway aligned with the discharge end of the sludge delivery means.

5. Apparatus according to claim 1 further comprising nozzle means attached to the first dispersing means adjacent the outlets.

6. Apparatus according to claim 5 wherein the first dispersing means comprises a first section attached to the discharge end of the sludge delivery means and a second section axially aligned with and separable from the first section, a plurality of male elements extending from the first section alignable within a corresponding plurality of female recesses formed within the second section, the channelling means comprising channels formed within and along all of the male elements and female recesses, and wherein the plurality of channels converge toward the interior of a lower base portion of the first section to form a single inlet passageway aligned with the discharge end of the sludge delivery means.

7. Apparatus according to claim 1 wherein each of the second sludge dispersing means comprises a body having a sludge impact surface with a concave face converging centrally to form a generally conical tip extending from the face, the second dispersing means being adjustably secured to the inner wall of the vessel around the inner periphery thereof.

8. Apparatus according to claim 7 further comprising a plurality of angled vanes attached to the periphery of the second dispersing means to further divide the sludge particles, and ball and socket means for adjustably securing the second dispersing means to the inner wall of the vessel.

9. Apparatus according to claim 1 wherein each of the second dispersing means is attached to the first dispersing means and comprises a body having an impact surface for directing a portion of the sludge exiting the channelling means generally upwardly and outwardly toward the walls of the vessel.

10. Apparatus according to claim 9 wherein the second dispersing means includes means for adjusting the proximity of the second dispersing means to the first dispersing means.

11. Apparatus according to claim 10 wherein the adjusting means comprises a body attached to a shaft which is threaded through a mounting bracket attached to the first dispersing means.

12. Apparatus according to claim 11 wherein the first dispersing means comprises a first section attached to the discharge end of the sludge delivery means and a second section axially aligned with and separable from the first section, a plurality of male elements extending from the first section alignable within a corresponding plurality of female recesses formed within the second section, the channelling means comprising channels formed within and along all of the male elements and female recesses, and wherein the plurality of channels converge toward the interior of a lower base portion of the first section to form a single inlet passageway aligned with the discharge end of the sludge delivery means.

13. Apparatus according to claim 11 wherein the body of the second dispersing means is generally conical whereby the sides of the cone form the impact surface.

14. Apparatus according to claim 2 further comprising driving means and means for connecting the second section of the first dispersing means to the driving means, whereby the driving means axially reciprocates the second section so that its distance from the first section of the first dispersing means is adjustable.

15. Apparatus according to claim 14 wherein the driving means includes at least one hydraulic cylinder lift means.

16. Apparatus according to claim 6 further comprising driving means and means for connecting the second section of the first dispersing means to the driving means, whereby the driving means axially reciprocates the second section so that its distance from the first section of the first dispersing means is adjustable.

17. Apparatus according to claim 16 wherein the driving means includes at least one hydraulic cylinder lift means.

18. Apparatus according to claim 12 further comprising driving means and means for connecting the second section of the first dispersing means to the driving means, whereby the driving means axially reciprocates the second section so that its distance from the first section of the first dispersing means is adjustable.

19. Apparatus according to claim 18 wherein the driving means includes at least one hydraulic cylinder lift means.

* * * * *